US010333757B2

(12) United States Patent
Ren et al.

(10) Patent No.: US 10,333,757 B2
(45) Date of Patent: Jun. 25, 2019

(54) FBMC-BASED PILOT SENDING METHOD, CHANNEL ESTIMATION METHOD, AND RELATED APPARATUSES

(71) Applicant: HUAWEI TECHNOLOGIES CO., LTD., Shenzhen (CN)

(72) Inventors: Guangmei Ren, Chengdu (CN); Hua Yan, Chengdu (CN); Lei Min, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 15/383,218

(22) Filed: Dec. 19, 2016

(65) Prior Publication Data

US 2017/0099172 A1    Apr. 6, 2017

Related U.S. Application Data

(63) Continuation of application No. PCT/CN2014/080808, filed on Jun. 26, 2014.

(51) Int. Cl.
*H04L 12/28* (2006.01)
*H04L 27/26* (2006.01)
(Continued)

(52) U.S. Cl.
CPC .......... *H04L 27/264* (2013.01); *H04L 5/0005* (2013.01); *H04L 5/0048* (2013.01);
(Continued)

(58) Field of Classification Search
CPC ... H04L 27/264; H04L 27/261; H04L 5/0048; H04L 5/0005; H04L 25/0202; H04L 27/26
See application file for complete search history.

(56) References Cited

U.S. PATENT DOCUMENTS 7,254,158 B2 *  8/2007  Agrawal ............... H04B 1/715
                                                      375/136
7,609,790 B2 * 10/2009  Shah .................... H04B 1/7107
                                                      375/140
(Continued)

FOREIGN PATENT DOCUMENTS

CN    101877689 A    11/2010
CN    103368889 A    10/2013
(Continued)

OTHER PUBLICATIONS

International Search Report issued in International Application No. PCT/CN2014/080808 dated Mar. 30, 2015, 4 pages.
(Continued)

*Primary Examiner* — Phuc H Tran
(74) *Attorney, Agent, or Firm* — Fish & Richardson P.C.

(57) ABSTRACT

The present disclosure provides an FBMC-based pilot sending method, a channel estimation method, and a related apparatus. The FBMC-based pilot sending method includes: for each transmit antenna port, inserting a pilot symbol group at four consecutive FBMC time-frequency resource locations, where the pilot symbol group includes two auxiliary pilot symbols and two primary pilot symbols; calculating a transmit value of each auxiliary pilot symbol in the pilot symbol group according to obtained interference coefficient values and obtained transmit values of data symbols at time-frequency resource locations in a time-frequency resource location range in which each primary pilot symbol is interfered with; and sending the pilot symbol group, where the pilot symbol group includes the calculated transmit values of the auxiliary pilot symbols.

22 Claims, 11 Drawing Sheets

(51) Int. Cl.
　　H04L 5/00　　　(2006.01)
　　H04L 25/02　　(2006.01)
(52) U.S. Cl.
　　CPC .......... H04L 25/0202 (2013.01); H04L 27/26 (2013.01); H04L 27/261 (2013.01)

(56) References Cited

U.S. PATENT DOCUMENTS

| | | | |
|---|---|---|---|
| 9,781,738 B2* | 10/2017 | Pietraski | H04W 72/1263 |
| 2004/0229615 A1* | 11/2004 | Agrawal | H04B 1/715 |
| | | | 455/436 |
| 2012/0039297 A1 | 2/2012 | Sun et al. | |
| 2012/0044902 A1 | 2/2012 | Sun et al. | |
| 2015/0043683 A1 | 2/2015 | Kato et al. | |
| 2015/0049836 A1 | 2/2015 | Li et al. | |

FOREIGN PATENT DOCUMENTS

| | | |
|---|---|---|
| EP | 2713542 A1 | 4/2014 |
| WO | 2008007019 A2 | 1/2008 |
| WO | 2013121958 A1 | 8/2013 |

OTHER PUBLICATIONS

3GPP TSG RAN WG1#43 R1-051458,"Some practical aspects for OFDM/OQAM channel estimation", France Telecom, Nov. 7-11, 2005; 6 pages.
Lele et al.,"Channel Estimation With Scattered Pilots in OFDM/OQAM", Signal Processing Advances in Wireless Communications, 2008; 5 pages.
Yoon et al.,"Pilot Structure for high Data Rate in OFDM/OQAM-IOTA System", Vehicular Technology Conference, 2008; 5 pages.
Kliks et al.,"Power Loading for FBMC Systems: An Analysis with Mercury-filling Approach", ICT 2013, IEEE, May 6, 2013; 5 pages.
Extended European Search Report issued in European Application No. 14896060.2 dated Nov. 2, 2017; 11 pages.

* cited by examiner

… (1) …

FBMC-BASED PILOT SENDING METHOD, CHANNEL ESTIMATION METHOD, AND RELATED APPARATUSES

CROSS-REFERENCE TO RELATED APPLICATIONS

This application is a continuation of International Application No. PCT/CN2014/080808, filed on Jun. 26, 2014, the disclosure of which is hereby incorporated by reference in its entirety.

TECHNICAL FIELD

The present disclosure relates to the field of communications technologies, and in particular, to an FBMC-based pilot sending method, a channel estimation method, and a related apparatus.

BACKGROUND

A filter bank multicarrier (FBMC) technology is referred to as one of candidate technologies of next generation mobile communication. Compared with a current commonly used multicarrier technology, such as a cyclic prefix-orthogonal frequency division multiplexing (CP-OFDM) technology, the FBMC technology has advantages such as a desirable outband suppression effect, high frequency spectrum utilization, and flexible use of a frequency spectrum. Multi-input multi-output (MIMO) is a technology in which multiple transmit antennas or receive antennas are used to increase a system throughput and a transmission distance, and is a mandatory technology in a current wireless communications system. In the wireless communications system, to resist impact of a radio channel on transmitted data, a receive end needs to perform channel estimation, for example, perform channel estimation in an OFDM system by using an orthogonal pilot. However, the FBMC system has inherent interference, and consequently, a sent pilot symbol is polluted at the receive end. Therefore, both design of a pilot sending algorithm and a channel estimation algorithm directly affect final channel estimation performance.

There are mainly two existing MIMO-FBMC pilot sending methods: an interference approximation method (IAM) and an auxiliary pilot method (APM). However, the IAM method has disadvantages of high pilot overheads and low spectral efficiency. Compared with the IAM method, the APM method has low pilot overheads, but an auxiliary pilot causes a power increase, and especially in an MIMO case, the power increase is severer.

SUMMARY

Embodiments of the present disclosure disclose an FBMC-based pilot sending method, a channel estimation method, and a related apparatus, so as to reduce pilot overheads and a power increase caused by an auxiliary pilot, and improve channel estimation performance.

A first aspect of the embodiments of the present disclosure discloses an FBMC-based pilot sending method, including:

for each transmit antenna port, inserting a pilot symbol group at four consecutive FBMC time-frequency resource locations, where the pilot symbol group includes two auxiliary pilot symbols and two primary pilot symbols;

for each primary pilot symbol, determining a time-frequency resource location range in which the primary pilot symbol is interfered with;

for each primary pilot symbol, obtaining transmit values of data symbols at time-frequency resource locations in the determined time-frequency resource location range in which the primary pilot symbol is interfered with;

for each primary pilot symbol, obtaining, according to multiplex converter response data, interference coefficient values of interference caused at the time-frequency resource locations to the primary pilot symbol, where the time-frequency resource locations are in the determined time-frequency resource location range corresponding to the primary pilot symbol;

calculating a transmit value of each auxiliary pilot symbol in the pilot symbol group according to the obtained interference coefficient values and the obtained transmit values of the data symbols at the time-frequency resource locations at which each primary pilot symbol is interfered with; and sending the pilot symbol group, where the pilot symbol group includes the calculated transmit values of the auxiliary pilot symbols.

In a first possible implementation manner of the first aspect of the embodiments of the present disclosure, the inserting a pilot symbol group at four consecutive FBMC time-frequency resource locations includes:

respectively inserting a first auxiliary pilot symbol, a first primary pilot symbol, a second primary pilot symbol, and a second auxiliary pilot symbol at a $K^{th}$, a $(K+1)^{th}$, a $(K+2)^{th}$, and a $(K+3)^{th}$ FBMC symbol locations on a same subcarrier at the time-frequency resource locations, where K is a natural number; or respectively inserting a first auxiliary pilot symbol, a first primary pilot symbol, a second primary pilot symbol, and a second auxiliary pilot symbol on a $N^{th}$, a $(N+1)^{th}$, a $(N+2)^{th}$, and a $(N+3)^{th}$ FBMC subcarriers at a same FBMC symbol location at the time-frequency resource locations, where N is a natural number.

With reference to an implementation manner of the first aspect of the embodiments of the present disclosure or the first possible implementation manner of the first aspect of the embodiments of the present disclosure, in a second possible implementation manner of the first aspect of the embodiments of the present disclosure, the determining a time-frequency resource location range in which the primary pilot symbol is interfered with includes:

for each primary pilot symbol in the pilot symbol group, determining, according to the multiplex converter response data and a time-frequency resource location of the primary pilot symbol, the time-frequency resource location range in which the primary pilot symbol is interfered with.

With reference to the implementation manner of the first aspect of the present disclosure or the first possible implementation manner of the first aspect of the present disclosure, in a third possible implementation manner of the first aspect of the embodiments of the present disclosure, the determining a time-frequency resource location range in which the primary pilot symbol is interfered with includes:

obtaining a preset time-frequency resource location range in which the primary pilot symbol is interfered with.

With reference to the implementation manner of the first aspect of the present disclosure or the first possible implementation manner of the first aspect of the present disclosure, in a fourth possible implementation manner of the first aspect of the embodiments of the present disclosure, the determining a time-frequency resource location range in which the primary pilot symbol is interfered with includes:

determining, based on an interference estimation algorithm, the time-frequency resource location range in which the primary pilot symbol is interfered with.

With reference to any one of the implementation manner of the first aspect of the present disclosure or the first to the fourth possible implementation manners of the first aspect of the present disclosure, in a fifth possible implementation manner of the first aspect of the embodiments of the present disclosure, the calculating a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with includes:

for an auxiliary pilot symbol adjacent to the primary pilot symbol in the pilot symbol group, adding up values obtained after separately multiplying the obtained transmit values of the data symbols corresponding to the primary pilot symbol by the interference coefficient values of the interference caused at the time-frequency resource locations of the data symbols to the primary pilot symbol, and using the calculated added result as a first result;

dividing the first result by an interference coefficient value of interference caused at a time-frequency resource location of the auxiliary pilot symbol to the primary pilot symbol, and using the calculated result as a second result; and determining a value obtained after the second result is negated as the transmit value of the auxiliary pilot symbol.

In a sixth possible implementation manner of the first aspect of the embodiments of the present disclosure, when time-frequency resource locations at which the first auxiliary pilot symbol, the first primary pilot symbol, the second primary pilot symbol, and the second auxiliary pilot symbol in the pilot symbol group are located are $(m_k,n_k),(m_k,n_{k+1}),(m_k,n_{k+2}),(m_k,n_{k+3})$; a time-frequency resource location range in which the first primary pilot symbol is interfered with is $\check{\Omega}_{m_k,n_{k+1}}$; a time-frequency resource location range in which the second primary pilot symbol is interfered with is $\check{\Omega}_{m_k,n_{k+2}}$; the first auxiliary pilot symbol and the second auxiliary pilot symbol of a transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k,n-n_{k+1})}$, where the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k,n-n_{k+2})}$, where the time-frequency resource location (m, n) is in the time-frequency resource location range corresponding to the second primary pilot symbol, transmit values of the first auxiliary pilot symbol $a_{m_k,n_k}^j$ and the second auxiliary pilot symbol $a_{m_k,n_{k+3}}^j$ in the pilot symbol group are specifically:

$$a_{m_k,n_k}^j = -\frac{\left(\sum_{(m,n)\in\check{\Omega}_{m_k,n_{k+1}}} a_{m,n}^j \zeta_{(m-m_k,n-n_{k+1})}\right)}{\zeta_{(m_k-m_k,n_k-n_{k+1})}}$$

$$a_{m_k,n_{k+3}}^j = -\frac{\left(\sum_{(m,n)\in\check{\Omega}_{m_k,n_{k+2}}} a_{m,n}^j \zeta_{(m-m_k,n-n_{k+2})}\right)}{\zeta_{(m_k-m_k,n_{k+3}-n_{k+2})}}$$

where
$\check{\Omega}_{m_k,n_{k+1}} = \{(m,n), \zeta_{(m-m_k,n-n_{k+1})}\neq 0,$ and $(m,n)\neq\{(m_k,n_k),(m_k,n_{k+1}),(m_k,n_{k+2})\}\}$,
$\check{\Omega}_{m_k,n_{k+2}} = \{(m,n), \zeta_{(m-m_k,n-n_{k+2})}\neq 0,$ and $(m,n)\neq\{(m_k,n_{k+3}),(m_k,n_{k+1}),(m_k,n_{k+2})\}\}$.

With reference to any one of the first aspect of the embodiments of the present disclosure or the first to the sixth possible implementation manners of the first aspect of the embodiments of the present disclosure, in a seventh possible implementation manner of the first aspect of the embodiments of the present disclosure, primary pilot symbols on different transmit antenna ports are sent in a code division manner.

A second aspect of the embodiments of the present disclosure discloses a channel estimation method, including:

obtaining receive values at time-frequency resource locations at which primary pilot symbols sent from each transmit antenna port to each receive antenna port are located, where interference caused by other data symbols to the primary pilot symbols is cancelled for the receive values by using auxiliary pilot symbols;

determining a receiving sequence from each transmit antenna port to each receive antenna port; and calculating, for each transmit antenna port to each receive antenna port, an estimation value of a channel between the transmit antenna port and the receive antenna port according to the receive values of the primary pilot symbols and the receiving sequence.

In a first possible implementation manner of the second aspect of the embodiments of the present disclosure, the determining a receiving sequence from each transmit antenna port to each receive antenna port includes:

obtaining an interference response matrix for the time-frequency resource locations at which the primary pilot symbols at a transmit end are located;

obtaining a transmit matrix that includes transmit values of primary pilot symbols at the transmit end; and calculating the receiving sequence from each transmit antenna port to each receive antenna port according to the interference response matrix and the transmit matrix.

With reference to the first possible implementation manner of the second aspect of the embodiments of the present disclosure, in a second possible implementation manner of the second aspect of the embodiments of the present disclosure, when the interference response matrix of the transmit end is $\Gamma$, the transmit matrix of the transmit end is P, and a receiving sequence of a transmit antenna port j is $[b_0^j, b_1^j, \ldots, b_n^j]^T$, the calculating the receiving sequence of the transmit antenna port is specifically:

$[b_0^j, b_1^j, \ldots, b_n^j]^T = \Gamma^{-1}P^{-1}(0, \ldots, 0, w_j, 0, \ldots, 0)^T$, where $b_n^j$ is a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n−1, $w_j$ in $(0, \ldots, 0, w_j, 0, \ldots, 0)^T$ appears at the $j^{th}$ location, and values at other locations are 0.

In a third possible implementation manner of the second aspect of the embodiments of the present, the calculating, for each transmit antenna port to each receive antenna port, an estimation value of a channel between the transmit antenna port and the receive antenna port according to the receive values of the primary pilot symbols and the receiving sequence includes:

for each transmit antenna port to each receive antenna port, calculating a product of row vectors that include the receive values of the primary pilot symbols and column vectors that include the receiving sequence of the transmit antenna port; and calculating a ratio of the product result to pilot channel estimation gain power of the transmit antenna port, and using the ratio as the estimation value of the channel between the transmit antenna port and the receive antenna port.

With reference to the third possible implementation manner of the second aspect of the embodiments of the present disclosure, in a fourth possible implementation manner of the second aspect of the embodiments of the present disclosure, for each transmit antenna port on each receive antenna port, when receive values of primary pilot symbols of a receive antenna port i are separately $r^i_0, r^i_1, \ldots, r^i_n$, where $r^i_n$ is a receive value at a time-frequency resource location at which the $n^{th}$ primary pilot symbol of the receive antenna port i is located, and an estimation value of a channel between the transmit antenna port j and the receive antenna port i is $H_{ij}$, the calculating an estimation value of a channel between the transmit antenna port and the receive antenna port is specifically:

$$H_{ij}=[r^i_0,r^i_1,\ldots,r^i_n][b^j_0,b^j_1,\ldots,b^j_n]^T/w_j.$$

With reference to the first possible implementation manner of the second aspect of the embodiments of the present disclosure, in a fifth possible implementation manner of the second aspect of the embodiments of the present disclosure, the obtaining an interference response matrix for the time-frequency resource locations at which the primary pilot symbols at a transmit end are located includes:

receiving an interference response matrix indication message sent by the transmit end; and determining, according to the interference response matrix indication message, the interference response matrix for the time-frequency resource locations at which the primary pilot symbols at the transmit end are located.

With reference to the first possible implementation manner of the second aspect of the embodiments of the present disclosure, in a sixth possible implementation manner of the second aspect of the embodiments of the present disclosure, the obtaining an interference response matrix for the time-frequency resource locations at which the primary pilot symbols at a transmit end are located includes:

determining time-frequency resource locations, in a pilot symbol group, at which the primary pilot symbols at the transmit end are interfered with;

obtaining interference coefficient values of interference caused at the determined time-frequency resource locations in the pilot symbol group to the primary pilot symbols; and constructing the interference response matrix by using the interference coefficient values.

With reference to the sixth possible implementation manner of the second aspect of the embodiments of the present disclosure, in a seventh possible implementation manner of the second aspect of the embodiments of the present disclosure, the determining time-frequency resource locations, in a pilot symbol group, at which the primary pilot symbols at the transmit end are interfered with includes:

for each primary pilot symbol in the pilot symbol group, determining, according to multiplex converter response data and a time-frequency resource location of the primary pilot symbol, the time-frequency resource location at which the primary pilot symbol is interfered with.

With reference to the sixth possible implementation manner of the second aspect of the embodiments of the present disclosure, in an eighth possible implementation manner of the second aspect of the embodiments of the present disclosure, the determining time-frequency resource locations, in a pilot symbol group, at which the primary pilot symbols at the transmit end are interfered with includes:

obtaining preset time-frequency resource locations, in the pilot symbol group, at which the primary pilot symbols are interfered with.

With reference to the sixth possible implementation manner of the second aspect of the embodiments of the present disclosure, in a ninth possible implementation manner of the second aspect of the embodiments of the present disclosure, the determining time-frequency resource locations, in a pilot symbol group, at which the primary pilot symbols at the transmit end are interfered with includes:

receiving an interference indication message sent by the transmit end; and determining, according to the interference indication message, the time-frequency resource locations, in the pilot symbol group, at which the primary pilot symbols at the transmit end are interfered with.

With reference to the sixth possible implementation manner of the second aspect of the embodiments of the present disclosure, in a tenth possible implementation manner of the second aspect of the embodiments of the present disclosure, the obtaining interference coefficient values of interference caused at the determined time-frequency resource locations in the pilot symbol group to the primary pilot symbols includes:

obtaining, according to multiplex converter response data, the interference coefficient values of the interference caused at the time-frequency resource locations to the primary pilot symbols, where the time-frequency resource locations are in the determined time-frequency resource location range corresponding to the primary pilot symbols.

With reference to the sixth possible implementation manner of the second aspect of the embodiments of the present disclosure, in an eleventh possible implementation manner of the second aspect of the embodiments of the present disclosure, the obtaining interference coefficient values of interference caused at the determined time-frequency resource locations in the pilot symbol group to the primary pilot symbols includes:

receiving an interference coefficient table indication message sent by the transmit end; and obtaining the interference coefficient values, in the interference coefficient table indication message, of the interference caused at the determined time-frequency resource locations to the primary pilot symbols.

With reference to any one of the second aspect of the embodiments of the present disclosure or the first to the eleventh possible implementation manners of the second aspect of the embodiments of the present disclosure, in a twelfth possible implementation manner of the second aspect of the embodiments of the present disclosure, primary pilot symbols that are on different transmit antenna ports are sent by the transmit end are distinguished in a code division manner.

A third aspect of the embodiments of the present disclosure discloses an FBMC-based pilot sending apparatus, including:

a pilot inserting unit, configured to: for each transmit antenna port, insert a pilot symbol group at four consecutive FBMC time-frequency resource locations, where the pilot symbol group includes two auxiliary pilot symbols and two primary pilot symbols;

a first determining unit, configured to: for each primary pilot symbol inserted by the pilot inserting unit, determine a time-frequency resource location range in which the primary pilot symbol is interfered with;

a first obtaining unit, configured to: for each primary pilot symbol, obtain transmit values of data symbols at time-frequency resource locations in the time-frequency resource location range that is determined by the first determining unit and in which the primary pilot symbol is interfered with;

a second obtaining unit, configured to: for each primary pilot symbol, obtain, according to multiplex converter response data, interference coefficient values of interference caused at the time-frequency resource locations to the primary pilot symbol, where the time-frequency resource locations are in the time-frequency resource location range that is determined by the first determining unit and that is corresponding to the primary pilot symbol;

a calculation unit, configured to: calculate a transmit value of each auxiliary pilot symbol in the pilot symbol group according to the interference coefficient values obtained by the second obtaining unit and the transmit values that are obtained by the first obtaining unit and are of the data symbols at the time-frequency resource locations in the time-frequency resource location range in which each primary pilot symbol is interfered with; and a sending unit, configured to send the pilot symbol group, where the pilot symbol group includes the calculated transmit values of the auxiliary pilot symbols.

In a first possible implementation manner of the third aspect of the embodiments of the present disclosure, the pilot inserting unit is specifically configured to respectively insert a first auxiliary pilot symbol, a first primary pilot symbol, a second primary pilot symbol, and a second auxiliary pilot symbol at a $K^{th}$, a $(K+1)^{th}$, a $(K+2)^{th}$, and a $(K+3)^{th}$ FBMC symbol locations on a same subcarrier at the time-frequency resource locations, where K is a natural number; or respectively insert a first auxiliary pilot symbol, a first primary pilot symbol, a second primary pilot symbol, and a second auxiliary pilot symbol on a $N^{th}$, a $(N+1)^{th}$, a $(N+2)^{th}$, and a $(N+3)^{th}$ FBMC subcarriers at a same FBMC symbol location at the time-frequency resource locations, where N is a natural number.

With reference to an implementation manner of the third aspect of the embodiments of the present disclosure or the first possible implementation manner of the third aspect of the embodiments of the present disclosure, in a second possible implementation manner of the third aspect of the embodiments of the present disclosure, the first determining unit is specifically configured to: for each primary pilot symbol in the pilot symbol group inserted by the pilot inserting unit, determine, according to the multiplex converter response data and a time-frequency resource location of the primary pilot symbol, the time-frequency resource location range in which the primary pilot symbol is interfered with.

In a third possible implementation manner of the third aspect of the embodiments of the present disclosure, the first determining unit is specifically configured to obtain a preset time-frequency resource location range in which the primary pilot symbol in the pilot symbol group inserted by the pilot inserting unit is interfered with.

In a fourth possible implementation manner of the third aspect of the embodiments of the present disclosure, the first determining unit is specifically configured to determine, based on an interference estimation algorithm, the time-frequency resource location range in which the primary pilot symbol in the pilot symbol group inserted by the pilot inserting unit is interfered with.

With reference to any one of the implementation manner of the third aspect of the embodiments of the present disclosure or the first to the fourth possible implementation manners of the third aspect of the embodiments of the present disclosure, in a fifth possible implementation manner of the third aspect of the embodiments of the present disclosure, the calculation unit includes:

a first calculation unit, configured to: for an auxiliary pilot symbol adjacent to the primary pilot symbol in the pilot symbol group, add up values obtained after separately multiplying the obtained transmit values of the data symbols corresponding to the primary pilot symbol by the interference coefficient values of the interference caused at the time-frequency resource locations of the data symbols to the primary pilot symbol, and use the calculated added result as a first result;

a second calculation unit, configured to: divide the first result calculated by the first calculation unit by an interference coefficient value of interference caused at a time-frequency resource location of the auxiliary pilot symbol to the primary pilot symbol, and use the calculated result as a second result; and a second determining unit, configured to determine a value obtained after the second result calculated by the second calculation unit is negated as the transmit value of the auxiliary pilot symbol.

With reference to the fifth possible implementation manner of the third aspect of the embodiments of the present disclosure, in a sixth possible implementation manner of the third aspect of the embodiments of the present disclosure, when time-frequency resource locations at which the first auxiliary pilot symbol, the first primary pilot symbol, the second primary pilot symbol, and the second auxiliary pilot symbol in the pilot symbol group are located are $(m_k,n_k)$, $(m_k,n_{k+1})$, $(m_k,n_{k+2})$, $(m_k,n_{k+3})$; a time-frequency resource location range in which the first primary pilot symbol is interfered with is $\tilde{\Omega}_{m_k n_{k+1}}$; a time-frequency resource location range in which the second primary pilot symbol is interfered with is $\tilde{\Omega}_{m_k n_{k+2}}$; the first auxiliary pilot symbol and the second auxiliary pilot symbol of a transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k, n-n_{k+1})}$, where the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k, n-n_{k+2})}$, where the time-frequency resource location (m, n) is in the time-frequency resource location range corresponding to the second primary pilot symbol, transmit values, calculated by the calculation unit, of the first auxiliary pilot symbol $a_{m_k,n_k}^j$ and the second auxiliary pilot symbol $a_{m_k,n_{k+3}}^j$ are:

$$a_{m_k,n_k}^j = -\frac{\left(\sum_{(m,n)\in\Omega_{m_k n_{k+1}}} a_{mn}^j \zeta_{(m-m_k, n-n_{k+1})}\right)}{\zeta_{(m_k-m_k, n_k-n_{k+1})}}$$

$$a_{m_k,n_{k+3}}^j = -\frac{\left(\sum_{(m,n)\in\Omega_{m_k n_{k+2}}} a_{mn}^j \zeta_{(m-m_k, n-n_{k+2})}\right)}{\zeta_{(m_k-m_k, n_{k+3}-n_{k+2})}}$$

where
$\check{\Omega}_{m_k n_{k+1}} = \{(m,n), \zeta_{(m-m_k, n-n_{k+1})} \neq 0, \text{ and } (m,n) \neq \{(m_k, n_k), (m_k, n_{k+1}), (m_k, n_{k+2})\}\}$,
$\check{\Omega}_{m_k n_{k+2}} = \{(m,n), \zeta_{(m-m_k, n-n_{k+2})} \neq 0, \text{ and } (m,n) \neq \{(m_k, n_{k+3}), (m_k, n_{k+1}), (m_k, n_{k+2})\}\}$, With reference to any one of the third aspect of the embodiments of the present disclosure or the first to the sixth possible implementation manners of the third aspect of the embodiments of the present disclosure, in a seventh possible implementation manner of the third aspect of the embodiments of the present disclosure, the sending unit sends primary pilot symbols on different transmit antenna ports in a code division manner.

A fourth aspect of the embodiments of the present disclosure discloses a channel estimation apparatus, including:

an obtaining unit, configured to obtain receive values at time-frequency resource locations at which primary pilot symbols sent from each transmit antenna port to each receive antenna port are located, where interference caused by other data symbols to the primary pilot symbols is cancelled for the receive values by using auxiliary pilot symbols;

a determining unit, configured to determine a receiving sequence from each transmit antenna port to each receive antenna port; and a calculation unit, configured to: for each transmit antenna port to each receive antenna port, calculate an estimation value of a channel between the transmit antenna port and the receive antenna port according to the receive values obtained by the obtaining unit that are of the primary pilot symbols and the receiving sequence determined by the determining unit.

In a first possible implementation manner of the fourth aspect, the determining unit includes:

a first obtaining unit, configured to obtain an interference response matrix for the time-frequency resource locations at which the primary pilot symbols at a transmit end are located;

a second obtaining unit, configured to obtain a transmit matrix that includes transmit values of primary pilot symbols at the transmit end; and a first calculation unit, configured to calculate the receiving sequence from each transmit antenna port to each receive antenna port according to the interference response matrix and the transmit matrix.

With reference to the first possible implementation manner of the fourth aspect of the embodiments of the present disclosure, in a second possible implementation manner of the fourth aspect of the embodiments of the present disclosure, when the interference response matrix of the transmit end is $\Gamma$, the transmit matrix of the transmit end is P, and a receiving sequence of a transmit antenna port j is $[b^j_0, b^j_1, \ldots, b^j_n]^T$, that the first calculation unit calculates the receiving sequence of the transmit antenna port is specifically:

$[b^j_0, b^j_1, \ldots, b^j_n]^T = \Gamma^{-1} P^{-1} (0, \ldots, 0, w_j, 0, \ldots, 0)^T$, where $b^j_n$ is a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n-1, $w_j$ in $(0, \ldots, 0, w_j, 0, \ldots, 0)^T$ appears at the $j^{th}$ location, and values at other locations are 0.

In a third possible implementation manner of the fourth aspect of the embodiments of the present disclosure, the calculation unit includes:

a third calculation unit, configured to: for each transmit antenna port to each receive antenna port, calculate a product of row vectors that include the receive values obtained by the obtaining unit that are of the primary pilot symbols and column vectors that include the receiving sequence that is determined by the determining unit and is of the transmit antenna port; and a fourth calculation unit, configured to: calculate a ratio of a result calculated by the third calculation unit to pilot channel estimation gain power of the transmit antenna port, and use the ratio as the estimation value of the channel between the transmit antenna port and the receive antenna port.

With reference to the third possible implementation manner of the fourth aspect of the embodiments of the present disclosure, in a fourth possible implementation manner of the fourth aspect of the embodiments of the present disclosure, for each transmit antenna port on each receive antenna port, when receive values of primary pilot symbols of a receive antenna port i are separately $r^i_0, r^i_1, \ldots, r^i_n$, where $r^i_n$ is a receive value at a time-frequency resource location at which the $n^{th}$ primary pilot symbol of the receive antenna port i is located, and an estimation value of a channel between the transmit antenna port j and the receive antenna port i is $H_{ij}$, that the calculation unit calculates an estimation value of a channel between the transmit antenna port and the receive antenna port is specifically:

$H_{ij} = [r^i_0, r^i_1, \ldots, r^i_n][b^j_0, b^j_1, \ldots, b^j_n]^T / w_j$.

With reference to the first possible implementation manner of the fourth aspect of embodiments of the present disclosure, in a fifth possible implementation manner of the fourth aspect of the embodiments of the present disclosure, the first obtaining unit includes:

a first receiving unit, configured to receive an interference response matrix indication message sent by the transmit end; and a first determining unit, configured to determine the interference response matrix for the time-frequency resource locations of the primary pilot symbols at the transmit end according to the interference response matrix indication message.

With reference to the first possible implementation manner of the fourth aspect of embodiments of the present disclosure, in a sixth possible implementation manner of the fourth aspect of the embodiments of the present disclosure, the first obtaining unit includes:

a second determining unit, configured to determine time-frequency resource locations, in a pilot symbol group, at which the primary pilot symbols at the transmit end are interfered with; and a second obtaining unit, configured to: obtain interference coefficient values of interference caused at the determined time-frequency resource locations in the pilot symbol group to the primary pilot symbols, and construct the interference response matrix by using the interference coefficient values.

With reference to the sixth possible implementation manner of the fourth aspect of the embodiments of the present disclosure, in a seventh possible implementation manner of the fourth aspect of the embodiments of the present disclosure, the second determining unit is specifically configured to: for each primary pilot symbol in the pilot symbol group, determine, according to multiplex converter response data and a time-frequency resource location of the primary pilot symbol, the time-frequency resource location at which the primary pilot symbol is interfered with.

With reference to the sixth possible implementation manner of the fourth aspect of the embodiments of the present disclosure, in an eighth possible implementation manner of the fourth aspect of the embodiments of the present disclosure, the second determining unit is specifically configured to obtain preset time-frequency resource locations, in the pilot symbol group, at which the primary pilot symbols are interfered with.

With reference to the sixth possible implementation manner of the fourth aspect of embodiments of the present disclosure, in a ninth possible implementation manner of the fourth aspect of the embodiments of the present disclosure, the second determining unit includes:

a second receiving unit, configured to receive an interference indication message sent by the transmit end; and a third determining unit, configured to determine the time-frequency resource locations, in the pilot symbol group, at which the primary pilot symbols at the transmit end are interfered with.

With reference to the sixth possible implementation manner of the fourth aspect of the embodiments of the present disclosure, in a tenth possible implementation manner of the fourth aspect of the embodiments of the present disclosure, the second obtaining unit is specifically configured to: obtain, according to multiplex converter response data, the interference coefficient values of the interference caused at the time-frequency resource locations determined by the second determining unit to the primary pilot symbols; and construct the interference response matrix by using the interference coefficient values.

With reference to the sixth possible implementation manner of the fourth aspect of embodiments of the present disclosure, in an eleventh possible implementation manner of the fourth aspect of the embodiments of the present disclosure, the second obtaining unit includes:

a third receiving unit, configured to receive an interference coefficient table indication message sent by the transmit end; and a third obtaining unit, configured to: obtain the interference coefficient values, in the interference coefficient table indication message, of the interference caused at the determined time-frequency resource locations to the primary pilot symbols; and construct the interference response matrix by using the interference coefficient values.

With reference to any one of the fourth aspect of the embodiments of the present disclosure or the first to the eleventh possible implementation manners of the fourth aspect of the embodiments of the present disclosure, in a twelfth possible implementation manner of the fourth aspect of the embodiments of the present disclosure, primary pilot symbols that are on different transmit antenna ports are sent by the transmit end are distinguished in a code division manner.

A fifth aspect of the embodiments of the present disclosure discloses a computer storage medium, where the computer storage medium stores a program, and when the program is performed, all or some steps of the FBMC-based pilot sending method disclosed in the first aspect of the embodiments of the present disclosure are included.

A sixth aspect of the embodiments of the present disclosure discloses a computer storage medium, where the computer storage medium stores a program, and when the program is performed, all or some steps of the channel estimation method disclosed in the second aspect of the embodiments of the present disclosure are included.

A seventh aspect of the embodiments of the present disclosure discloses a sending device, including: a processor, at least one transmit antenna port connected to the processor by using an interface, and a memory connected to the processor by using a bus, where the memory stores a group of program code, and the processor is configured to invoke the program code stored in the memory to perform the following operations:

for each transmit antenna port, inserting a pilot symbol group at four consecutive FBMC time-frequency resource locations, where the pilot symbol group includes two auxiliary pilot symbols and two primary pilot symbols;

for each primary pilot symbol, determining a time-frequency resource location range in which the primary pilot symbol is interfered with;

for each primary pilot symbol, obtaining transmit values of data symbols at time-frequency resource locations in the determined time-frequency resource location range in which the primary pilot symbol is interfered with;

for each primary pilot symbol, obtaining, according to multiplex converter response data, interference coefficient values of interference caused at the time-frequency resource locations to the primary pilot symbol, where the time-frequency resource locations are in the determined time-frequency resource location range corresponding to the primary pilot symbol;

calculating a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with; and sending the pilot symbol group, where the pilot symbol group includes the calculated transmit values of the auxiliary pilot symbols.

In a first possible implementation manner of the seventh aspect of the embodiments of the present disclosure, the inserting, by the processor, a pilot symbol group at four consecutive FBMC time-frequency resource locations includes:

respectively inserting a first auxiliary pilot symbol, a first primary pilot symbol, a second primary pilot symbol, and a second auxiliary pilot symbol at a $K^{th}$, a $(K+1)^{th}$, a $(K+2)^{th}$, and a $(K+3)^{th}$ FBMC symbol locations on a same subcarrier at the time-frequency resource locations, where K is a natural number; or respectively inserting a first auxiliary pilot symbol, a first primary pilot symbol, a second primary pilot symbol, and a second auxiliary pilot symbol on a $N^{th}$, a $(N+1)^{th}$, a $(N+2)^{th}$ and a $(N+3)^{th}$ FBMC subcarriers at a same FBMC symbol location at the time-frequency resource locations, where N is a natural number.

With reference to an implementation manner of the seventh aspect of the embodiments of the present disclosure or the first possible implementation manner of the seventh aspect of the embodiments of the present disclosure, in a second possible implementation manner of the seventh aspect of the embodiments of the present disclosure, the determining, by the processor, a time-frequency resource location range in which the primary pilot symbol is interfered with includes:

for each primary pilot symbol in the pilot symbol group, determining, according to the multiplex converter response data and a time-frequency resource location of the primary pilot symbol, the time-frequency resource location range in which the primary pilot symbol is interfered with.

With reference to the implementation manner of the seventh aspect of the embodiments of the present disclosure or the first possible implementation manner of the seventh aspect of the embodiments of the present disclosure, in a third possible implementation manner of the seventh aspect of the embodiments of the present disclosure, the determining, by the processor, a time-frequency resource location range in which the primary pilot symbol is interfered with includes:

obtaining a preset time-frequency resource location range in which the primary pilot symbol is interfered with.

With reference to the implementation manner of the seventh aspect of the embodiments of the present disclosure or the first possible implementation manner of the seventh aspect of the embodiments of the present disclosure, in a fourth possible implementation manner of the seventh aspect of the embodiments of the present disclosure, the determining, by the processor, a time-frequency resource location range in which the primary pilot symbol is interfered with includes:

determining, based on an interference estimation algorithm, the time-frequency resource location range in which the primary pilot symbol is interfered with.

With reference to any one of the implementation manner of the seventh aspect of the embodiments of the present disclosure or the first to the fourth possible implementation manners of the seventh aspect of the embodiments of the present disclosure, in a fifth possible implementation manner of the seventh aspect of the embodiments of the present disclosure, the calculating, by the processor, a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with includes:

for an auxiliary pilot symbol adjacent to the primary pilot symbol in the pilot symbol group, adding up values obtained after separately multiplying the obtained transmit values of the data symbols corresponding to the primary pilot symbol by the interference coefficient values of the interference caused at the time-frequency resource locations of the data symbols to the primary pilot symbol, and using the calculated added result as a first result;

dividing the first result by an interference coefficient value of interference caused at a time-frequency resource location of the auxiliary pilot symbol to the primary pilot symbol, and using the calculated result as a second result; and determining a value obtained after the second result is negated as the transmit value of the auxiliary pilot symbol.

With reference to the fifth possible implementation manner of the seventh aspect of the embodiments of the present disclosure, in a sixth possible implementation manner of the seventh aspect of the embodiments of the present disclosure, when time-frequency resource locations at which the first auxiliary pilot symbol, the first primary pilot symbol, the second primary pilot symbol, and the second auxiliary pilot symbol in the pilot symbol group are located are $(m_k,n_k)$, $(m_k,n_{k+1}),(m_k,n_{k+2}),(m_k,n_{k+3})$; a time-frequency resource location range in which the first primary pilot symbol is interfered with is $\check{\Omega}_{m_k,n_{k+1}}$; a time-frequency resource location range in which the second primary pilot symbol is interfered with is $\check{\Omega}_{m_k,n_{k+2}}$; the first auxiliary pilot symbol and the second auxiliary pilot symbol of a transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k,n-n_{k+1})}$, where the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k,n-n_{k+2})}$, where the time-frequency resource location (m, n) is in the time-frequency resource location range corresponding to the second primary pilot symbol, transmit values of the first auxiliary pilot symbol $a_{m_k,n_k}^j$ and the second auxiliary pilot symbol $a_{m_k,n_{k+3}}^j$ in the pilot symbol group are specifically:

$$a_{m_k,n_k}^j = -\frac{\left(\sum_{(m,n)\in\check{\Omega}_{m_k,n_{k+1}}} a_{m,n}^j \zeta_{(m-m_k,n-n_{k+1})}\right)}{\zeta_{(m_k-m_k,n_k-n_{k+1})}}$$

$$a_{m_k,n_{k+3}}^j = -\frac{\left(\sum_{(m,n)\in\check{\Omega}_{m_k,n_{k+2}}} a_{m,n}^j \zeta_{(m-m_k,n-n_{k+2})}\right)}{\zeta_{(m_k-m_k,n_{k+3}-n_{k+2})}}$$

where
$\check{\Omega}_{m_k,n_{k+1}} = \{(m,n), \zeta_{(m-m_k,n-n_{k+1})} \neq 0, \text{ and } (m,n) \neq \{(m_k,n_k),(m_k,n_{k+1}),(m_k,n_{k+2})\}\}$.
$\check{\Omega}_{m_k,n_{k+2}} = \{(m,n), \zeta_{(m-m_k,n-n_{k+2})} \neq 0, \text{ and } (m,n) \neq \{(m_k,n_{k+3}),(m_k,n_{k+3}),(m_k,n_{k+2})\}\}$.

With reference to any one of the seventh aspect of the embodiments of the present disclosure or the first to the sixth possible implementation manners of the seventh aspect of the embodiments of the present disclosure, in a seventh possible implementation manner of the seventh aspect of the embodiments of the present disclosure, the processor sends primary pilot symbols on different transmit antenna ports in a code division manner.

An eighth aspect of the embodiments of the present disclosure discloses a receiving device, including: a processor, at least one receive antenna port connected to the processor by using an interface, and a memory connected to the processor by using a bus, where the memory stores a group of program code, and the processor is configured to invoke the program code stored in the memory to perform the following operations:

obtaining receive values at time-frequency resource locations at which primary pilot symbols sent from each transmit antenna port to each receive antenna port are located, where interference caused by other data symbols to the primary pilot symbols is cancelled for the receive values by using auxiliary pilot symbols;

determining a receiving sequence from each transmit antenna port to each receive antenna port; and calculating, for each transmit antenna port to each receive antenna port, an estimation value of a channel between the transmit antenna port and the receive antenna port according to the receive values of the primary pilot symbols and the receiving sequence.

In a first possible implementation manner of the eighth aspect of the embodiments of the present disclosure, the determining, by the processor, a receiving sequence from each transmit antenna port to each receive antenna port includes:

obtaining an interference response matrix for the time-frequency resource locations at which the primary pilot symbols at a transmit end are located;

obtaining a transmit matrix that includes transmit values of primary pilot symbols at the transmit end; and calculating the receiving sequence from each transmit antenna port to each receive antenna port according to the interference response matrix and the transmit matrix.

With reference to the first possible implementation manner of the eighth aspect of the embodiments of the present disclosure, in a second possible implementation manner of the eighth aspect of the embodiments of the present disclosure, when the interference response matrix of the transmit end is Γ, the transmit matrix of the transmit end is P, and a receiving sequence of a transmit antenna port j is $[b^j_0, b^j_1, \ldots, b^j_n]^T$, the calculating, by the processor, the receiving sequence of the transmit antenna port is specifically:

$[b^j_0, b^j_1, \ldots, b^j_n]^T = \Gamma^{-1} P^{-1} (0, \ldots, 0, w_j, 0, \ldots, 0)^T$, where $b^j_n$ is a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n−1, $w_j$ in $(0, \ldots, 0, w_j, 0, \ldots, 0)^T$ appears at the $j^{th}$ location, and values at other locations are 0.

In a third possible implementation manner of the eighth aspect of the embodiments of the present, the calculating, by the processor for each transmit antenna port to each receive antenna port, an estimation value of a channel between the transmit antenna port and the receive antenna port according to the receive values of the primary pilot symbols and the receiving sequence includes:

for each transmit antenna port to each receive antenna port, calculating a product of row vectors that include the receive values of the primary pilot symbols and column vectors that include the receiving sequence of the transmit antenna port; and calculating a ratio of the product result to pilot channel estimation gain power of the transmit antenna port, and using the ratio as the estimation value of the channel between the transmit antenna port and the receive antenna port.

With reference to the third possible implementation manner of the eighth aspect of the embodiments of the present disclosure, in a fourth possible implementation manner of the eighth aspect of the embodiments of the present disclosure, for each transmit antenna port on each receive antenna port, when receive values of primary pilot symbols of a receive antenna port i are separately $r^i_0, r^i_1, \ldots, r^i_n$, where $r^i_n$ is a receive value at a time-frequency resource location at which the $n^{th}$ primary pilot symbol of the receive antenna port i is located, and an estimation value of a channel between the transmit antenna port j and the receive antenna port i is $H_{ij}$, the calculating, by the processor, an estimation value of a channel between the transmit antenna port and the receive antenna port is specifically:

$H_{ij} = [r^i_0, r^i_1, \ldots, r^i_n][b^j_0, b^j_1, \ldots, b^j_n]^T / w_j$.

With reference to the first possible implementation manner of the eighth aspect of the embodiments of the present disclosure, in a fifth possible implementation manner of the eighth aspect of the embodiments of the present disclosure, the obtaining, by the processor, an interference response matrix for the time-frequency resource locations at which the primary pilot symbols at a transmit end are located includes:

receiving an interference response matrix indication message sent by the transmit end; and determining the interference response matrix for the time-frequency resource locations of the primary pilot symbols at the transmit end according to the interference response matrix indication message.

With reference to the first possible implementation manner of the eighth aspect of the embodiments of the present disclosure, in a sixth possible implementation manner of the eighth aspect of the embodiments of the present disclosure, the obtaining, by the processor, an interference response matrix for the time-frequency resource locations at which the primary pilot symbols at a transmit end are located includes:

determining time-frequency resource locations, in a pilot symbol group, at which the primary pilot symbols at the transmit end are interfered with;

obtaining interference coefficient values of interference caused at the determined time-frequency resource locations in the pilot symbol group to the primary pilot symbols; and constructing the interference response matrix by using the interference coefficient values.

With reference to the sixth possible implementation manner of the eighth aspect of the embodiments of the present disclosure, in a seventh possible implementation manner of the eighth aspect of the embodiments of the present disclosure, the determining, by the processor, time-frequency resource locations, in a pilot symbol group, at which the primary pilot symbols at the transmit end are interfered with includes:

for each primary pilot symbol in the pilot symbol group, determining, according to multiplex converter response data and a time-frequency resource location of the primary pilot symbol, the time-frequency resource location at which the primary pilot symbol is interfered with.

With reference to the sixth possible implementation manner of the eighth aspect of the embodiments of the present disclosure, in an eighth possible implementation manner of the eighth aspect of the embodiments of the present disclosure, the determining, by the processor, time-frequency resource locations, in a pilot symbol group, at which the primary pilot symbols at the transmit end are interfered with includes:

obtaining preset time-frequency resource locations, in the pilot symbol group, at which the primary pilot symbols are interfered with.

With reference to the sixth possible implementation manner of the eighth aspect of the embodiments of the present disclosure, in a ninth possible implementation manner of the eighth aspect of the embodiments of the present disclosure, the determining, by the processor, time-frequency resource locations, in a pilot symbol group, at which the primary pilot symbols at the transmit end are interfered with includes:

receiving an interference indication message sent by the transmit end; and determining, according to the interference indication message, the time-frequency resource locations, in the pilot symbol group, at which the primary pilot symbols at the transmit end are interfered with.

With reference to the sixth possible implementation manner of the eighth aspect of the embodiments of the present disclosure, in a tenth possible implementation manner of the eighth aspect of the embodiments of the present disclosure, the obtaining, by the processor, interference coefficient values of interference caused at the determined time-frequency resource locations in the pilot symbol group to the primary pilot symbols includes:

obtaining, according to multiplex converter response data, the interference coefficient values of the interference caused at the determined time-frequency resource locations to the primary pilot symbols.

With reference to the sixth possible implementation manner of the eighth aspect of the embodiments of the present disclosure, in an eleventh possible implementation manner of the eighth aspect of the embodiments of the present disclosure, the obtaining, by the processor, interference coefficient values of interference caused at the determined time-frequency resource locations in the pilot symbol group to the primary pilot symbols includes:

receiving an interference coefficient table indication message sent by the transmit end; and obtaining the interference coefficient values, in the interference coefficient table indication message, of the interference caused at the determined time-frequency resource locations to the primary pilot symbols.

With reference to any one of the eighth aspect of the embodiments of the present disclosure or the first to the eleventh possible implementation manners of the eighth aspect of the embodiments of the present disclosure, in a twelfth possible implementation manner of the eighth aspect of the embodiments of the present disclosure, the processor distinguishes, in a code division manner, primary pilot symbols that are on different transmit antenna ports are sent by the transmit end.

Compared with the prior art, the embodiments of the present disclosure have the following beneficial effects:

In the embodiments of the present disclosure, for each transmit antenna port, a transmit end inserts a pilot symbol group at four FBMC consecutive time-frequency resource locations, and calculates a transmit value of each auxiliary pilot symbol in the pilot symbol group according to determined interference coefficient values of interference caused to each primary pilot symbol and determined transmit values of data symbols at time-frequency resource locations in a time-frequency resource location range in which the primary pilot symbol is interfered with. Then, the transmit end sends the pilot symbol group, so as to cancel interference caused by the data symbols to the primary pilot symbol in the pilot symbol group. A receive end obtains receive values at time-frequency resource locations at which primary pilot symbols sent from each transmit antenna port to each receive antenna port are located, and then determines a receiving sequence from each transmit antenna port to each receive antenna port. The receive end calculates an estimation value of a channel between the transmit antenna port and the receive antenna port according to the receive values and the receiving sequence of the transmit antenna port on each receive antenna port. By implementing the embodiments of the present disclosure, pilot overheads and a power increase caused by an auxiliary pilot symbol can be reduced, and channel estimation performance can be improved.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure disclose an FBMC-based pilot sending method, a channel estimation method, and a related apparatus, which are used to reduce pilot overheads and a power increase caused by an auxiliary pilot, and improve channel estimation performance. Details are separately illustrated in the following.

Figure 1:
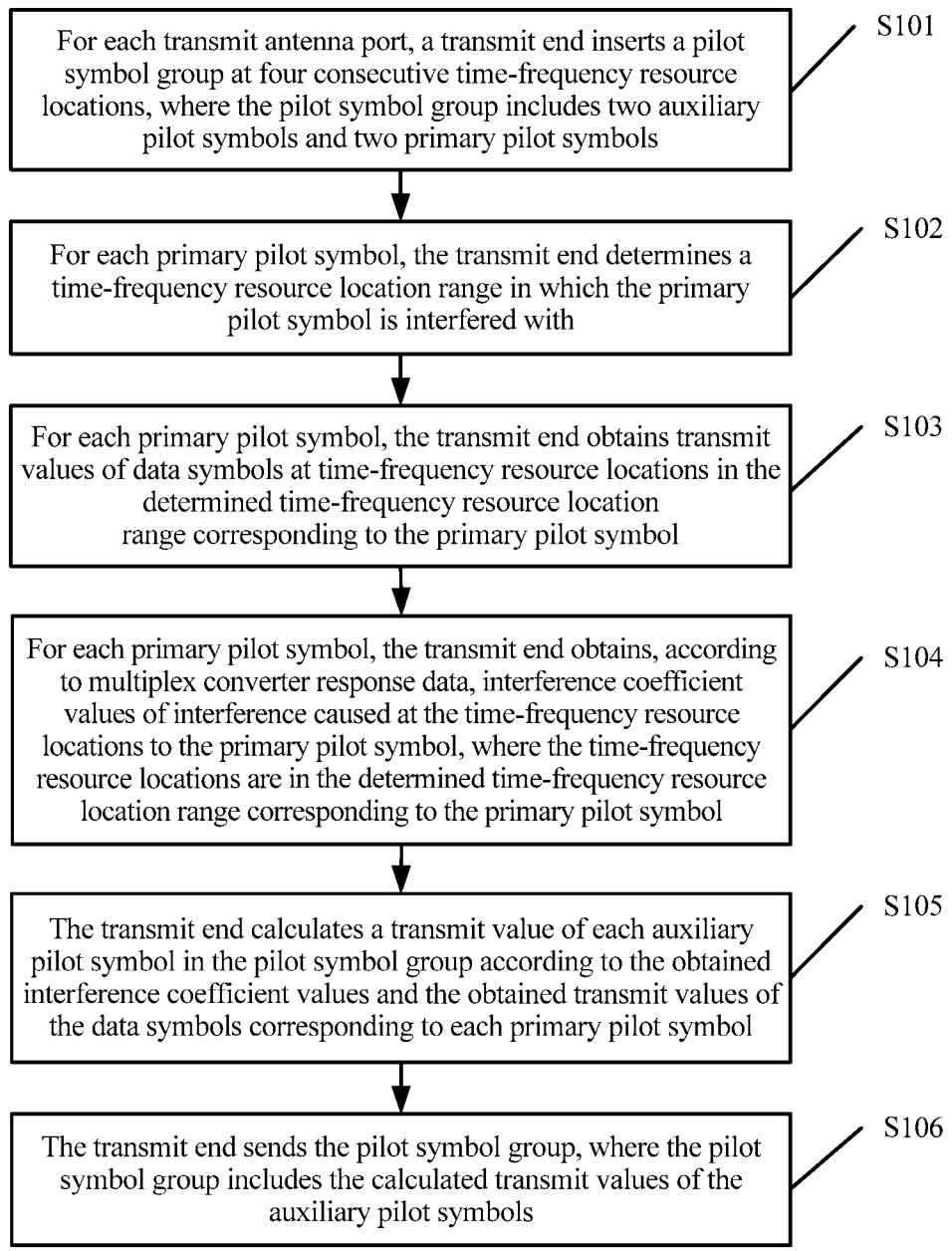
FIG. 1 is a schematic flowchart of an FBMC-based pilot sending method disclosed in an embodiment of the present disclosure.

Referring to FIG. 1, FIG. 1 is a schematic flowchart of an FBMC-based pilot sending method disclosed in an embodiment of the present disclosure. The method shown in FIG. 1 may be executed by user equipment or a mobile station that serves as a transmit end, or may be any other device that can work in a wireless environment, which is not limited in this embodiment of the present disclosure. As shown in FIG. 1, the pilot sending method includes the following steps.

S101. For each transmit antenna port, a transmit end inserts a pilot symbol group at four consecutive time-frequency resource locations, where the pilot symbol group includes two auxiliary pilot symbols and two primary pilot symbols.

That for each transmit antenna port, a transmit end inserts a pilot symbol group at four consecutive time-frequency resource locations is specifically: the transmit end respectively inserts a first auxiliary pilot symbol, a first primary pilot symbol, a second primary pilot symbol, and a second auxiliary pilot symbol at the $K^{th}$, the $(K+1)^{th}$, the $(K+2)^{th}$, and the $(K+3)^{th}$ FBMC symbol locations on a same subcarrier at the time-frequency resource locations, where K is a natural number; or respectively inserts a first auxiliary pilot symbol, a first primary pilot symbol, a second primary pilot symbol, and a second auxiliary pilot symbol on the $N^{th}$, the $(N+1)^{th}$, the $(N+2)^{th}$, and the $(N+3)^{th}$ FBMC subcarriers at a same FBMC symbol location at the time-frequency resource locations, where N is a natural number. The transmit end may insert a corresponding quantity of pilot symbol groups on each transmit antenna port according to a coherence time and coherence bandwidth of a system, that is, determine distribution density of pilot symbol groups.

Figure 2:
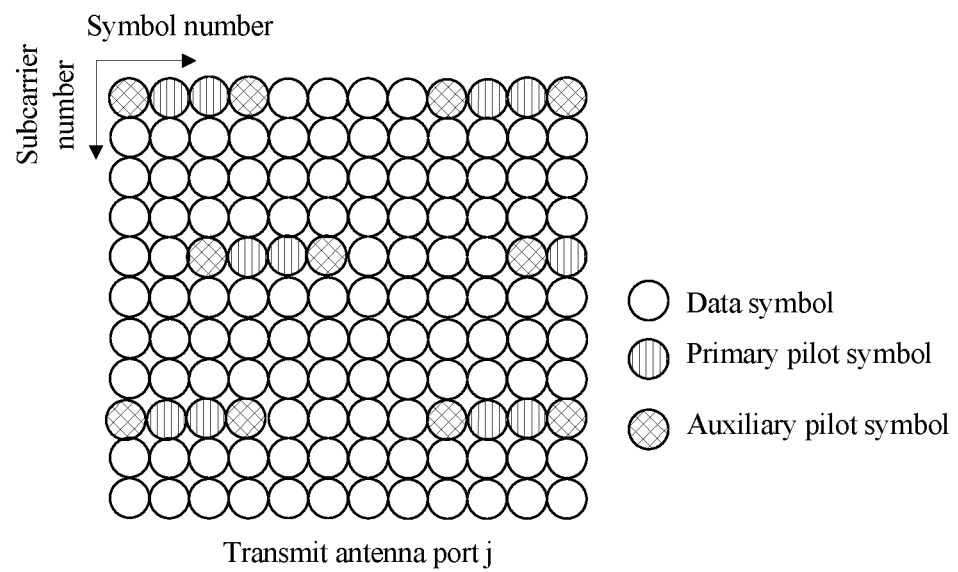
FIG. 2 is a specific distribution pattern of a pilot symbol group disclosed in an embodiment of the present disclosure.

For example, locations of pilot symbols in pilot symbol groups inserted on a transmit antenna port j by the transmit end are shown in a pilot pattern in FIG. 2. The pilot pattern includes data symbols (as shown in FIG. 2, a blank circle represents a data symbol), the first auxiliary pilot symbol $a^j_{m0,n0}$, the first primary pilot symbol $p^j_{m0,n1}$, the second primary pilot symbol $p^j_{m0,n2}$, and the second auxiliary pilot symbol $a^j_{m0,n3}$ in the pilot symbol group (as shown in FIG. 2, a grid circle represents an auxiliary pilot symbol, and a striped circle represents a primary pilot symbol).

S102. For each primary pilot symbol, the transmit end determines a time-frequency resource location range in which the primary pilot symbol is interfered with.

In an optional implementation manner, that the transmit end determines the time-frequency resource location range of other time-frequency resource locations at which each primary pilot symbol is interfered with may be determining, for each primary pilot symbol in the pilot symbol group according to multiplex converter response data and a time-frequency resource location of the primary pilot symbol, the time-frequency resource location range in which the primary pilot symbol is interfered with.

In another optional implementation manner, the transmit end may obtain a preset time-frequency resource location range in which the primary pilot symbol is interfered with. For example, once an FBMC or MIMO-FBMC system is determined, a filter or an overlapping factor that is used by the system is determined, that is, the time-frequency resource location range in which the primary pilot symbol is interfered with is determined. To reduce operation load of the transmit end, the time-frequency resource location range may be built into the system. Once the system is started, the transmit end can obtain the time-frequency resource location range for each primary pilot symbol.

In another optional implementation manner, the transmit end may determine, based on an interference estimation algorithm, the time-frequency resource location range in which the primary pilot symbol is interfered with. Specifically, the interference estimation algorithm means that the transmit end calculates interference coefficient power in a range according to multiplex converter response data. If interference coefficient power in a range is not greater than a threshold, it is considered that interference outside this range may be ignored, and this range is determined as the time-frequency resource location range in which the primary pilot symbol is interfered with. For example, for an IOTA filter, a specified threshold is that when interference coefficient power at a time-frequency resource location is less than 2% of total interference coefficient power, interference caused at the time-frequency resource location to the primary pilot symbol is ignored. Total interference coefficient power in a 3×3 time-frequency resource location range is 0.9877, and interference coefficient power outside this range is only 0.0123. That is, interference caused at another time-frequency resource location outside the 3×3 time-frequency resource location range to the primary pilot symbol is less than 2% of the total interference coefficient power, and it is considered that the time-frequency resource location range in which the primary pilot symbol is interfered with is 3×3.

S103. For each primary pilot symbol, the transmit end obtains transmit values of data symbols at time-frequency resource locations in the determined time-frequency resource location range corresponding to the primary pilot symbol.

S104. For each primary pilot symbol, the transmit end obtains, according to multiplex converter response data, interference coefficient values of interference caused at the time-frequency resource locations to the primary pilot symbol, where the time-frequency resource locations are in the determined time-frequency resource location range corresponding to the primary pilot symbol.

TABLE 1

| Subcarrier | Symbol | | |
|---|---|---|---|
| number | −1 | 0 | 1 |
| −1 | 0.2280j | −0.4411j | 0.2280j |
| 0 | −0.4411j | 1 | −0.4411j |
| 1 | 0.2280j | −0.4411j | 0.2280j |

In an optional implementation manner, the interference coefficient values of the interference caused at the time-frequency resource locations to the primary pilot symbol may be obtained according to an FBMC multiplex converter response, where the time-frequency resource locations are in the determined time-frequency resource location range corresponding to the primary pilot symbol. For example, Table 1 is a multiplex converter response (which uses an IOTA filter) in an FBMC system, and is used to indicate receive values, at time-frequency resource locations of a receive end, that are obtained when a transmit value at a central time-frequency resource location (0, 0) is 1 and transmit values at other time-frequency resource locations are 0. Rows in Table 1 indicate subcarrier numbers, columns indicate numbers of FBMC symbols in a time domain, and elements in the table are multiplex converter response data in an FBMC system. If the primary pilot symbol is sent at the central time-frequency resource location, the time-frequency resource location range in which the primary pilot symbol is interfered with is 3×3. That is, symbols in a range with two left symbols adjacent to the primary pilot symbol, two right symbols adjacent to the primary pilot symbol, two adjacent subcarriers above the primary pilot symbol, and two adjacent subcarriers below the primary pilot symbol cause interference to the primary pilot symbol. In this case, an interference coefficient value of interference caused by a symbol sent at a time-frequency resource location (m, n) to the primary pilot symbol sent at the central time-frequency resource location is response data at a location (−m, −n) shown in Table 1. For example, as shown in Table 1, an interference value caused at a time-frequency resource location (−1, −1) to the central time-frequency resource location (0, 0) is 0.2280j.

TABLE 2

| Subcarrier | Symbol | | |
|---|---|---|---|
| Number | −1 | 0 | 1 |
| −1 | 0.2280j | 0.4411j | 0.2280j |
| 0 | −0.4411j | 1 | 0.4411j |
| 1 | 0.2280j | −0.4411j | 0.2280j |

In another optional implementation manner, an interference coefficient table may be determined according to multiplex converter response data. The interference coefficient values of the interference caused at the time-frequency resource locations to the primary pilot symbol are obtained from the interference coefficient table, where the time-frequency resource locations are in the determined time-frequency resource location range corresponding to the primary pilot symbol. For example, Table 2 is an interference coefficient table obtained according to Table 1, and is used to represent interference coefficient values of interference caused at other time-frequency resource locations to the central time-frequency resource location (0, 0). Optionally, an interference coefficient table of the filter may be stored in the FBMC system in advance. In this way, the interference coefficient values of the interference caused to the primary pilot symbol may be directly determined according to the interference coefficient table and the determined time-frequency resource location range in which the primary pilot symbol is interfered with.

In still another optional implementation manner, the interference coefficient table may be preset in a system, and the transmit end directly obtains, according to the preset interference coefficient table, the interference coefficient values of the interference caused at the time-frequency resource locations to the primary pilot symbol, where the time-frequency resource locations are in the determined time-frequency resource location range corresponding to the primary pilot symbol.

For an FBMC system, if a primary pilot symbol, in a pilot symbol group, that is used for channel estimation and is sent at a time-frequency resource location $(m_0, n_1)$ on a transmit antenna port j is $p^j_{m0,n1}$, a receive symbol at the time-frequency resource location on a receive antenna port i of a receive end may be approximately indicated as formula (1):

$$\gamma^i_{m_0,n_1} = H^{ij}_{m0,n1} H_{m0,n1} \left( p^j_{m0,n1} + \sum_{(m,n) \in \Omega_{m0,n1}} a^j_{m,n} \xi_{(m-m_0,n-n_1)} \right) + \eta^i_{m_0,n_1} \quad (1)$$

$$\sum_{(m,n) \in \Omega_{m0,n1}} a^j_{m,n} \xi_{(m-m_0,n-n_1)} \quad (2)$$

In the formula, i indicates the $i^{th}$ receive antenna; $\Omega_{m0,n1}$ indicates a time-frequency resource location range in which the primary pilot symbol is interfered with; $H^{ij}_{m0,n1}$ indicates a coefficient that is of a frequency domain channel between the transmit antenna port j and the receive antenna port i and is at the time-frequency resource location $(m_0, n_1)$; $\xi_{(m-m_0,n-n_1)}$ indicates an interference coefficient value of interference caused by a transmit signal (for example, a data symbol) at a time-frequency resource location (m, n) to the location $(m_0, n_1)$ at which the primary pilot symbol is located, where the time-frequency resource location (m, n) is in the time-frequency resource location range in which the primary pilot symbol is interfered with, and the interference coefficient value may be obtained by using step S104; and $\eta^i_{m_0,n_1}$ indicates modulation noise of the $i^{th}$ receive antenna port.

To improve channel estimation performance, as shown in the formula (2) in the formula (1), interference caused to the primary pilot symbol by data symbols in the time-frequency resource location range in which the primary pilot symbol is interfered with needs to be offset by using an auxiliary pilot symbol. Specifically, after obtaining results of execution in S103 and S104, the transmit end achieves this effect by using the following step S105.

Further, steps S102, S103, and S104 may be executed in sequence; or S102 and S104 are executed first, and then S103 is executed; or steps S102 and S104 are combined and then executed. For example, if an interference coefficient table preset in a system or a multiplex converter response of a filter includes an interference range and interference coefficient information of the filter, a time-frequency resource range in which the primary pilot symbol is interfered with and the interference coefficient values of the interference caused at the time-frequency resource locations in the time-frequency resource range to the primary pilot symbol can be determined according to only the interference coefficient table or multiplex converter response data of the filter.

S105. The transmit end calculates a transmit value of each auxiliary pilot symbol in the pilot symbol group according to the obtained interference coefficient values and the obtained transmit values of the data symbols corresponding to each primary pilot symbol.

Specifically, for an auxiliary pilot symbol adjacent to the primary pilot symbol in the pilot symbol group, the transmit end adds up values obtained after separately multiplying the obtained transmit values of the data symbols corresponding to the primary pilot symbol by the interference coefficient values of the interference caused at the time-frequency resource locations corresponding to the data symbols to the primary pilot symbol, and uses the calculated added result as a first result. Then, the transmit end divides the first result by an interference coefficient value of interference caused at a time-frequency resource location of the auxiliary pilot symbol to the primary pilot symbol, and uses the calculated result as a second result. Finally, the transmit end determines a value obtained after the second result is negated as the transmit value of the auxiliary pilot symbol. When the transmit value of the auxiliary pilot symbol is being calculated, only the interference caused by the data symbols at the time-frequency resource locations in the time-frequency resource location range to the primary pilot symbol is considered, and there is no need to consider interference between the primary pilot symbols and transmit values of primary pilot symbols.

S106. The transmit end sends the pilot symbol group, where the pilot symbol group includes the calculated transmit values of the auxiliary pilot symbols.

Specifically, after calculating the transmit values of all the auxiliary pilot symbols in the pilot symbol group, the transmit end sends the pilot symbol group inserted on the transmit antenna port, so that after receiving a signal, a receive end performs channel estimation according to primary pilot symbols in pilot symbol groups, on a receive antenna port, that are sent from transmit antenna ports.

Further, the transmit end sends primary pilot symbols on different transmit antenna ports in a code division manner.

In this embodiment of the present disclosure, a transmit end inserts a pilot symbol group on a transmit antenna port, and two auxiliary pilot symbols and two primary pilot symbols in the pilot symbol group are sequentially inserted at corresponding time-frequency resource locations. Then, for each primary pilot symbol, the transmit end separately obtains a time-frequency resource location range in which the primary pilot symbol is interfered with and transmit values of data symbols at time-frequency resource locations in the time-frequency resource location range; determines, according to multiplex converter response data, interference coefficient values caused at the time-frequency resource locations in the time-frequency resource location range to the primary pilot symbol; and determines a transmit value of an auxiliary pilot symbol adjacent to the primary pilot symbol according to the transmit values of the data symbols in the time-frequency resource location range and the corresponding interference coefficient values. After the pilot symbol group (the pilot symbol group includes the calculated transmit values of the auxiliary pilot symbols) is sent, interference caused by the data symbols at the time-frequency resource locations in the time-frequency resource location range to the primary pilot symbol may be effectively cancelled for a receive value that is obtained by a receive end and is at a time-frequency resource location at which the primary pilot symbol is located, thereby laying a foundation for improving channel estimation performance. In addition, a power increase can be effectively reduced by using the auxiliary pilot symbols respectively adjacent to the two primary pilot symbols in the pilot symbol group.

Figure 3:
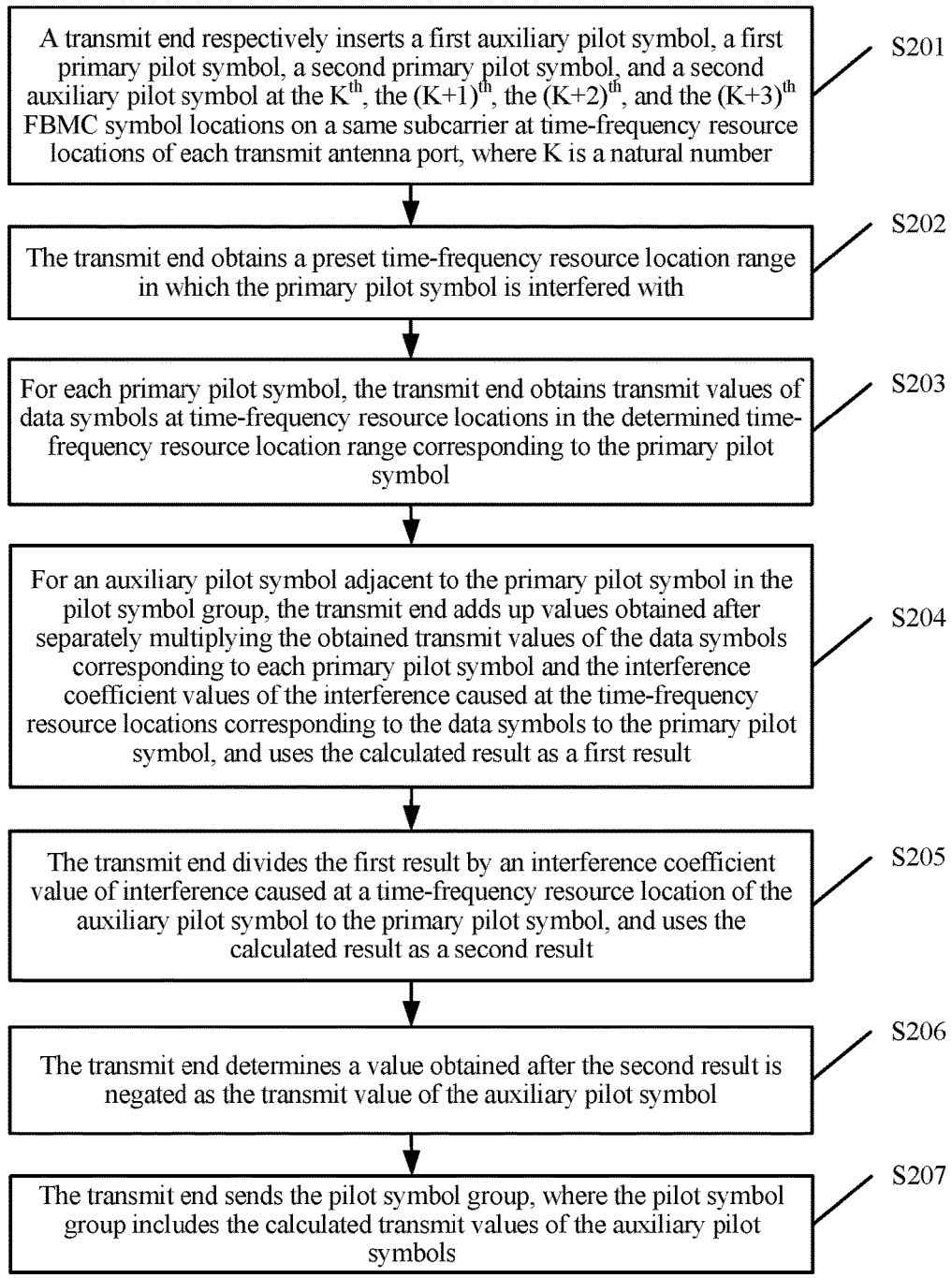
FIG. 3 is a schematic flowchart of another FBMC-based pilot sending method disclosed in an embodiment of the present disclosure.

Referring to FIG. 3, FIG. 3 is a schematic flowchart of another FBMC-based pilot sending method disclosed in an embodiment of the present disclosure. As shown in FIG. 3, the method includes the following steps.

S201. A transmit end respectively inserts a first auxiliary pilot symbol, a first primary pilot symbol, a second primary pilot symbol, and a second auxiliary pilot symbol at the $K^{th}$, the $(K+1)^{th}$, the $(K+2)^{th}$, and the $(K+3)^{th}$ FBMC symbol locations on a same subcarrier at time-frequency resource locations of each transmit antenna port, where K is a natural number.

A value of K depends on density of pilot symbol groups that are inserted on the transmit antenna port and that include the first auxiliary pilot symbol, the first primary pilot symbol, the second primary pilot symbol, and the second auxiliary pilot symbol.

S202. The transmit end obtains a preset time-frequency resource location range in which the primary pilot symbol is interfered with.

Specifically, the transmit end needs to obtain time-frequency resource location ranges in which first primary pilot symbols and second primary pilot symbols in pilot symbol groups inserted on transmit antenna ports are interfered with.

S203. For each primary pilot symbol, the transmit end obtains transmit values of data symbols at time-frequency resource locations in the determined time-frequency resource location range corresponding to the primary pilot symbol.

S204. For an auxiliary pilot symbol adjacent to the primary pilot symbol in the pilot symbol group, the transmit end adds up values obtained after separately multiplying the obtained transmit values of the data symbols corresponding to each primary pilot symbol by interference coefficient values of interference caused at the time-frequency resource locations corresponding to the data symbols to the primary pilot symbol, and uses the calculated added result as a first result.

S205. The transmit end divides the first result by an interference coefficient value of interference caused at a time-frequency resource location of the auxiliary pilot symbol to the primary pilot symbol, and uses the calculated result as a second result.

S206. The transmit end determines a value obtained after the second result is negated as the transmit value of the auxiliary pilot symbol.

Transmit values that are of the first auxiliary pilot symbol and the second auxiliary pilot symbol in the pilot symbol group and are determined in steps S204 to S206 may be calculated by using the following formula (3). Specifically, when time-frequency resource locations at which the first auxiliary pilot, the first primary pilot symbol, the second primary pilot symbol, and the second auxiliary pilot symbol in the pilot symbol group are located are $(m_k,n_k),(m_k,n_{k+1})$, $(m_k,n_{k+2}),(m_k,n_{k+3})$; a time-frequency resource location range in which the first primary pilot symbol is interfered with is $\check{\Omega}_{m_k,n_{k+1}}$; a time-frequency resource location range in which the second primary pilot symbol is interfered with is $\check{\Omega}_{m_k,n_{k+2}}$; the first auxiliary pilot symbol and the second auxiliary pilot symbol of the transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k,n-n_{k+1})}$, where the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k,n-n_{k+2})}$, where the time-frequency resource location (m, n) is in the time-frequency resource location range corresponding to the second primary pilot symbol, transmit values, calculated by the transmit end, of the first auxiliary pilot symbol $a_{m_k,n_k}^j$ and the second auxiliary pilot symbol $a_{m_k,n_{k+k}}^j$ in the pilot symbol group are:

$$a_{m_k,n_k}^j = -\frac{\left(\sum_{(m,n)\in\check{\Omega}_{m_k n_{k+1}}} a_{mn}^j \zeta_{(m-m_k,n-n_{k+1})}\right)}{\zeta_{(m_k-m_k,n_k-n_{k+1})}} \quad (3)$$

$$a_{m_k,n_{k+3}}^j = -\frac{\left(\sum_{(m,n)\in\check{\Omega}_{m_k n_{k+2}}} a_{mn}^j \zeta_{(m-m_k,n-n_{k+2})}\right)}{\zeta_{(m_k-m_k,n_{k+3}-n_{k+2})}}$$

where
$\check{\Omega}_{m_k,n_{k+1}}=\{(m,n),\ \zeta_{(m-m_k,n-n_{k+1})}\neq 0,\ \text{and}\ (m,n)\neq\{(m_k,n_k),(m_k,n_{k+1}),(m_k,n_{k+2})\}\}$,
$\check{\Omega}_{m_k,n_{k+2}}=\{(m,n),\ \zeta_{(m-m_k,n-n_{k+2})}\neq 0,\ \text{and}\ (m,n)\neq\{(m_k,n_{k+3}),(m_k,n_{k+1}),(m_k,n_{k+2})\}\}$.

S207. The transmit end sends the pilot symbol group, where the pilot symbol group includes the calculated transmit values of the auxiliary pilot symbols.

For an MIMO-FBMC system, the transmit end may have multiple transmit antenna ports, and may insert pilot symbol groups of specific density on all the transmit antenna ports according to a requirement for channel estimation performance. Each pilot symbol group includes a first auxiliary pilot symbol, a first primary pilot symbol, a second primary pilot symbol, and a second auxiliary pilot symbol at consecutive time-frequency resource locations. Further, the transmit end sends primary pilot symbols on the different transmit antenna ports in a code division manner.

In this embodiment of the present disclosure, a transmit end inserts, on a transmit antenna port, a pilot symbol group that includes a first auxiliary pilot symbol, a first primary pilot symbol, a second primary pilot symbol, and a second auxiliary pilot symbol at consecutive locations, so as to reduce a power increase caused by an auxiliary pilot. The transmit end obtains a time-frequency resource location range that is preset in an FBMC system and in which the primary pilot symbol in the pilot symbol group is interfered with, and determines transmit values of data symbols in the time-frequency resource location range and interference coefficient values, so as to calculate a transmit value of the auxiliary pilot symbol in the pilot symbol group, thereby cancelling interference caused by the data symbols in the time-frequency resource location range to the primary pilot symbol, and further improving channel estimation performance.

Figure 4:
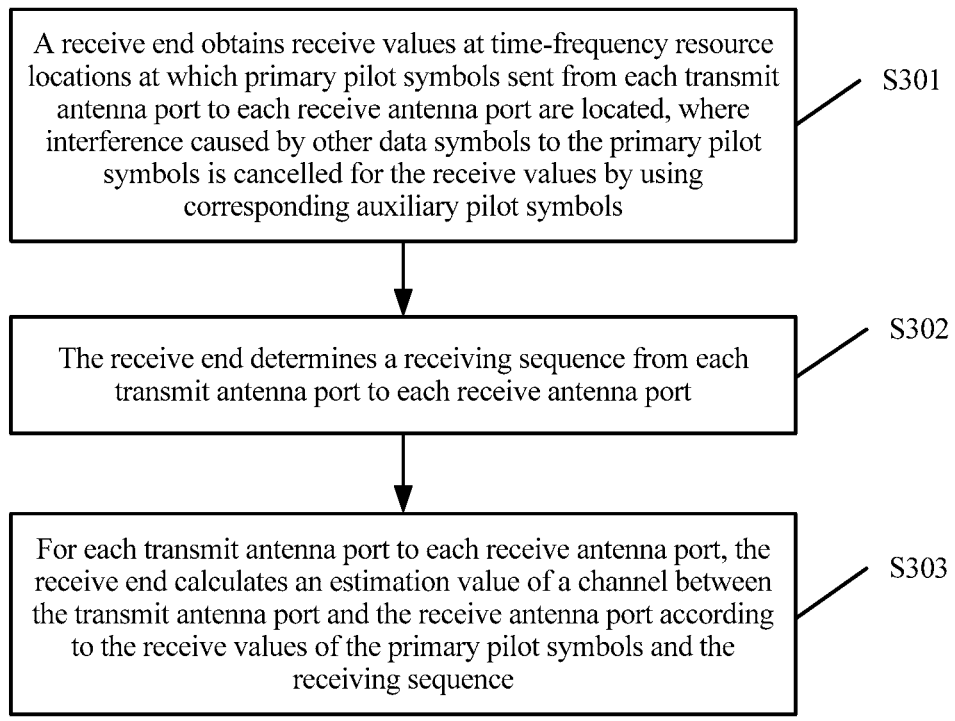
FIG. 4 is a schematic flowchart of a channel estimation method disclosed in an embodiment of the present disclosure.

Referring to FIG. 4, FIG. 4 is a schematic flowchart of a channel estimation method disclosed in an embodiment of the present disclosure. As shown in FIG. 4, the method includes the following steps.

S301. A receive end obtains receive values at time-frequency resource locations at which primary pilot symbols sent from each transmit antenna port to each receive antenna port are located, where interference caused by other data symbols to the primary pilot symbols is cancelled for the receive values by using corresponding auxiliary pilot symbols.

S302. The receive end determines a receiving sequence from each transmit antenna port to each receive antenna port.

In an optional implementation manner, the receive end may determine the receiving sequence by using the following steps: obtaining an interference response matrix for the time-frequency resource locations at which the primary pilot symbols at a transmit end are located, obtaining a transmit matrix that includes transmit values of primary pilot symbols at the transmit end; and calculating the receiving sequence from each transmit antenna port to each receive antenna port according to the interference response matrix and the transmit matrix.

The receive end may obtain, by using the following steps, the interference response matrix required in a process of determining the receiving sequence: receiving an interference response matrix indication message, sent by the transmit end, for the time-frequency resource locations at which the primary pilot symbols are located; and determining, from the interference response matrix indication message, the interference response matrix for the time-frequency resource locations at which the primary pilot symbols at the transmit end are located.

In another optional implementation manner, the receive end may obtain, by using the following steps, the interference response matrix required in a process of determining the receiving sequence: determining time-frequency resource locations, in a pilot symbol group, at which the primary pilot symbols at the transmit end are interfered with (only interference between adjacent primary pilot symbols is considered for the time-frequency resource locations determined by the receive end); obtaining interference coefficient values of interference caused at the time-frequency resource locations to the primary pilot symbols, where the time-frequency resource locations are in the time-frequency resource locations corresponding to the primary pilot symbols; and constructing the interference response matrix by using the interference coefficient values. The interference response matrix indicates a response matrix formed due to mutual interference between two adjacent primary pilot symbols in a pilot symbol group. For example, in a pilot symbol group shown in FIG. 2, it is assumed that a transmit value of a first primary pilot symbol at a time-frequency resource location $(m_0, n_1)$ is $p_{m0,n1}$, a transmit value of a second primary pilot symbol at a time-frequency resource location $(m_0, n_2)$ is $p_{m0,n2}$, an interference coefficient value of interference caused by the second primary pilot symbol to the first primary pilot symbol is b, and an interference coefficient value of interference caused by the first primary pilot symbol to the second primary pilot symbol is γ. Generally, according to the pilot symbol group sending manner shown in S101 in the first embodiment, b=−γ. Therefore, a receive signal $r_{m0,n1}$ at the time-frequency resource location $(m_0, n_1)$ at the receive end may be indicated as $r_{m0,n1}=p_{m0,n1}-\gamma p_{m0,n2}$ (impact of a channel and noise is not considered). Likewise, a receive signal $r_{m0,n2}$ at the time-frequency resource location $(m_0, n_2)$ at the receive end may be indicated as $r_{m0,n2}=p_{m0,n2}+\gamma p_{m0,n1}$. In this case, the receive signal may be:

$$\begin{pmatrix} r_{m0,n1} \\ r_{m0,n2} \end{pmatrix} = \begin{pmatrix} 1 & -\gamma \\ \gamma & 1 \end{pmatrix} \begin{pmatrix} p_{m0,n1} \\ p_{m0,n2} \end{pmatrix} \quad (4)$$

Therefore, the interference response matrix Γ constructed by the receive end by using the interference coefficient values at the time-frequency resource locations that are at the transmit end and are corresponding to the primary pilot symbols is:

$$\Gamma = \begin{pmatrix} 1 & -\gamma \\ \gamma & 1 \end{pmatrix} \quad (5)$$

The receive end may directly obtain, from an interference range indication message sent by the transmit end, the time-frequency resource locations that are in the pilot symbol group and at which the primary pilot symbols at the transmit end are interfered with; or the receive end determines, according to multiplex converter response data and time-frequency resource locations of the primary pilot symbols, the time-frequency resource locations at which the primary pilot symbols are interfered with; or the receive end directly determines the interference response matrix by using time-frequency resource locations that are preset in an FBMC system and at which the primary pilot symbols are interfered with.

In addition, that the receive end obtains, in a process of obtaining the interference response matrix, the interference coefficient values that are of interference caused to the primary pilot symbols and are corresponding to the primary pilot symbols may be specifically obtaining, according to the multiplex converter response data, the interference coefficient values of the interference caused at the time-frequency resource locations corresponding to the primary pilot symbols to the primary pilot symbols. Optionally, the receive end may receive an interference coefficient table indication message or a multiplex converter response indication message sent by the transmit end, and obtain, from the interference coefficient table indication message or the multiplex converter response indication message, the interference coefficient values of the interference caused at the determined time-frequency resource locations to the primary pilot symbols.

In another optional implementation manner, the receive end may use the following manner to determine the receiving sequence from each transmit antenna port to each receive antenna port: The receive end receives a receiving sequence indication message sent by the transmit end, and the receive end determines the receiving sequence from each transmit antenna port to each receive antenna port according to the receiving sequence indication message.

S303. For each transmit antenna port to each receive antenna port, the receive end calculates an estimation value of a channel between the transmit antenna port and the receive antenna port according to the receive values of the primary pilot symbols and the receiving sequence.

Specifically, that the receive end calculates the estimation value of the channel between the transmit antenna port and the receive antenna port may include the following step: for each transmit antenna port to each receive antenna port, calculating a product of row vectors that include the receive values of the primary pilot symbols and column vectors that include the receiving sequence of the transmit antenna port; and calculating a ratio of the product result to pilot channel estimation gain power of the transmit antenna port, and using the ratio as the estimation value of the channel between the transmit antenna port and the receive antenna port.

Further, the receive end distinguishes, in a code division manner, primary pilot symbols that are on different transmit antenna ports and are sent by the transmit end.

In this embodiment of the present disclosure, a receive end first obtains receive values at time-frequency resource locations at which primary pilot symbols sent from each transmit antenna port to each receive antenna port are located, where interference caused by other data symbols to the primary pilot symbols is cancelled for the receive values by using the pilot sending method, designed at a transmit end, in the foregoing embodiment. Then, because an FBMC system is a non-orthogonal system, the receive end needs to determine a receiving sequence from each transmit antenna port to each receive antenna port. Finally, the receive end calculates an estimation value of a channel between the transmit antenna port and the receive antenna port according to the received receive values and the receiving sequence. With reference to the pilot sending method in the foregoing embodiment of the present disclosure, by using the channel estimation method in this embodiment of the present disclosure, transmit power of an auxiliary pilot symbol can be effectively decreased, thereby reducing a power increase caused by an auxiliary pilot symbol, and optimizing channel estimation performance.

Figure 5:
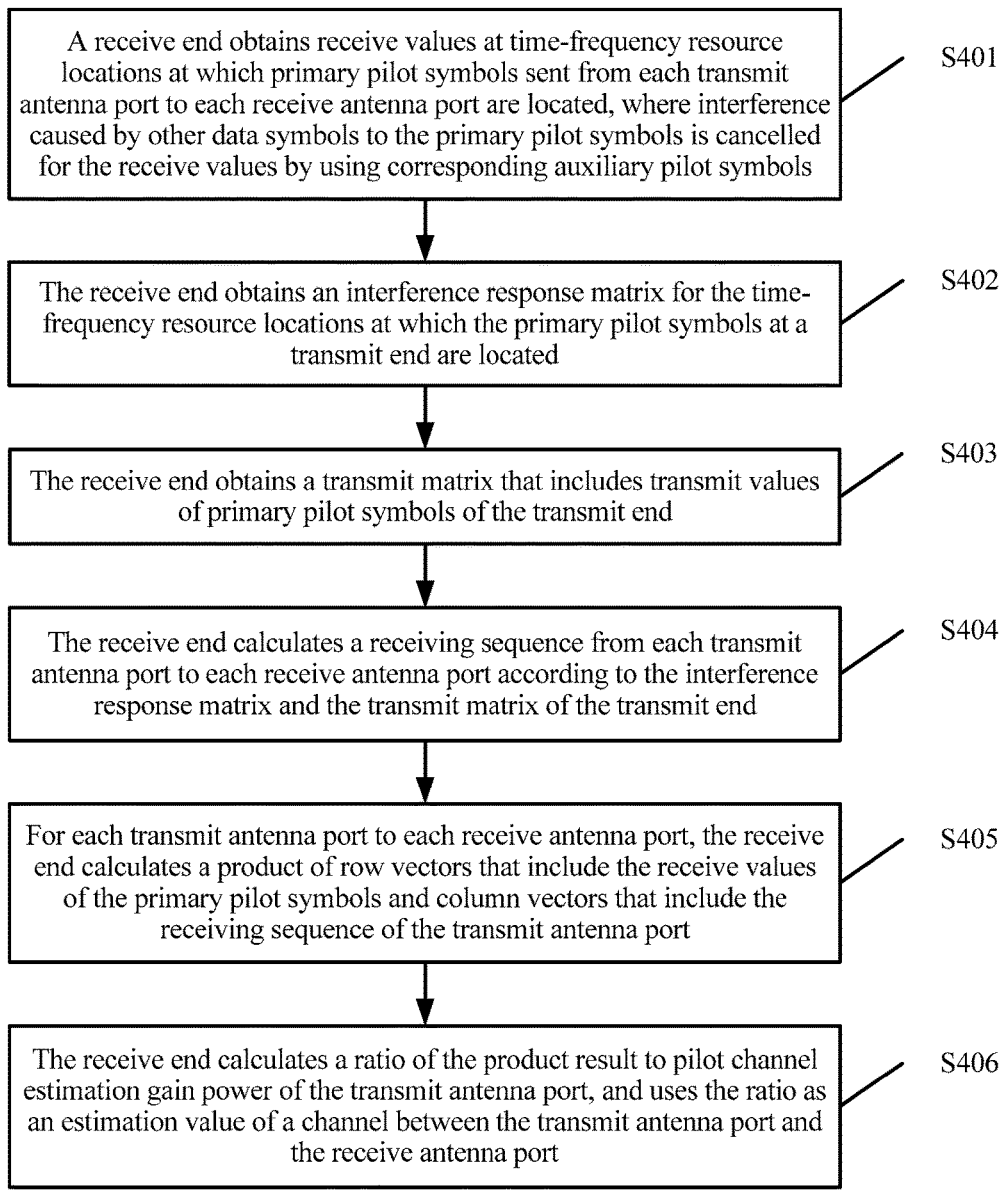
FIG. 5 is a schematic flowchart of another channel estimation method disclosed in an embodiment of the present disclosure.

Referring to FIG. 5, FIG. 5 is a schematic flowchart of another channel estimation method disclosed in an embodiment of the present disclosure. The channel estimation method shown in FIG. 5 is obtained by further optimizing the channel estimation method shown in FIG. 4. As shown in FIG. 5, the method includes the following steps.

S401. A receive end obtains receive values at time-frequency resource locations at which primary pilot symbols sent from each transmit antenna port to each receive antenna port are located, where interference caused by other data symbols to the primary pilot symbols is cancelled for the receive values by using corresponding auxiliary pilot symbols.

S402. The receive end obtains an interference response matrix for the time-frequency resource locations at which the primary pilot symbols at a transmit end are located.

S403. The receive end obtains a transmit matrix that includes transmit values of primary pilot symbols at the transmit end.

S404. The receive end calculates a receiving sequence from each transmit antenna port to each receive antenna port according to the interference response matrix and the transmit matrix of the transmit end.

A 1×2 MIMO-FBMC system is used as an example. An estimation value of a channel between a transmit antenna port 0 and a receive antenna port is represented as $H_0$, an estimation value of a channel between a transmit antenna port 1 and the receive antenna port is represented as $H_1$, pilot channel estimation gain power that is of the transmit antenna port 0 and is obtained by the receive end by using step S401 is $w_0$, pilot channel estimation gain power of the transmit antenna port 1 is $w_1$, the interference response matrix that is for the time-frequency resource locations at which the primary pilot symbols at the transmit end are located and that is obtained by the receive end by using step S402 is $$\Gamma = \begin{pmatrix} 1 & -\gamma \\ \gamma & 1 \end{pmatrix},$$

and a transmit matrix that includes transmit values of pilot symbols that are sent from the transmit antenna port 0 and the transmit antenna port 1 at the transmit end and are determined by the receive end by using step S403 is $$P = \begin{pmatrix} p^0_{m_0,n_1} & p^0_{m_0,n_2} \\ p^1_{m_0,n_1} & p^1_{m_0,n_2} \end{pmatrix}.$$

A receiving sequence ($b_0^0$ $b_1^0$) that is of the transmit antenna port 0 and is obtained by the receive end by means of calculation by using step S405 is specifically:

$$(b_0^0 b_1^0)^T = \Gamma^{-1} P^{-1} (w_0 0)^T \quad (6)$$

A receiving sequence ($b_0^1$ $b_1^1$) that is of the transmit antenna port 1 and is obtained by the receive end by means of calculation by using step S405 is specifically:

$$(b_0^1 b_0^1)^T = \Gamma^{-1} P^{-1} (0\ w_1)^T \quad (7)$$

The pilot channel estimation gain power indicates a ratio of joint pilot power for performing channel estimation by the receive end to power of a pilot symbol sent by the transmit end. For example, a CRS pilot in an MIMO-OFDM system is used as an example. A CRS pilot is sent in a time division or frequency division manner. The transmit end sends, at a time-frequency resource location (m, n), a pilot symbol $P_{m,n}$ whose transmit power is P. A value received by the receive end at the time-frequency resource location (m, n) is $r_{m,n} = H_{m,n} p_{m,n} + n_{m,n}$. $H_{m,n}$ indicates a frequency domain channel coefficient at the time-frequency resource location (m, n), and $n_{m,n}$ indicates noise at the time-frequency resource location (m, n). Channel estimation is performed by using a formula $r_{m,n} p^*_{m,n} = H_{m,n} p_{m,n} p^*_{m,n} + n_{m,n} p^*_{m,n} = H_{m,n} \|p_{m,n}\|^2 + n_{m,n} p^*_{m,n}$, where * indicates performing conjugating on a variable, and $\| \|$ indicates taking an absolute value of a variable. Because channel estimation is independently performed at the time-frequency resource location by using the CRS pilot, joint pilot power for performing channel estimation by the receive end is still P, and pilot channel estimation gain power of the transmit end is 1. A DRS pilot in the MIMO-OFDM system is used as an example. A DRS is sent in a code division manner, and channel estimation is performed jointly by using DRSs on two adjacent pilot symbols. Therefore, joint pilot power for channel estimation is 2P, and pilot channel estimation gain power is 2. For the MIMO-FBMC system, because the MIMO-FBMC system has inherent interference, pilot channel estimation gain power in the MIMO-FBMC system is related to an interference coefficient in the MIMO-FBMC system. The 1×2 MIMO-FBMC system is used as an example. It is assumed that a transmit matrix that includes transmit values of the transmit antenna port 0 and the transmit antenna port 1 is $$P = \begin{pmatrix} 1 & 1 \\ 1 & -1 \end{pmatrix}.$$

According to the foregoing determined interference response matrix $$\Gamma = \begin{pmatrix} 1 & -\gamma \\ \gamma & 1 \end{pmatrix},$$

pilot channel estimation gain power $w_0$ of the transmit antenna port 0 and pilot channel estimation gain power $w_1$ of the transmit antenna port 1 are $w_0 = w_1 = 2(1+\gamma^2)$. The receiving sequences of the transmit antenna port 0 and the transmit antenna port 1 may be respectively obtained by substituting $w_0$ and $w_1$ into the formula (6) and the formula (7).

$$\begin{pmatrix} b_0^0 \\ b_1^0 \end{pmatrix} = \begin{pmatrix} 1+\gamma \\ -\gamma+1 \end{pmatrix} \quad (8)$$

$$\begin{pmatrix} b_0^1 \\ b_1^1 \end{pmatrix} = \begin{pmatrix} -1+\gamma \\ 1+\gamma \end{pmatrix} \quad (9)$$

S405. For each transmit antenna port to each receive antenna port, the receive end calculates a product of row vectors that include the receive values of the primary pilot symbols and column vectors that include the receiving sequence of the transmit antenna port.

S406. The receive end calculates a ratio of the product result to pilot channel estimation gain power of the transmit antenna port, and uses the ratio as an estimation value of a channel between the transmit antenna port and the receive antenna port.

The foregoing 1×2 MIMO-FBMC system is still used as an example. Receive values that are at time-frequency resource locations at which the primary pilot symbols are located and that are obtained by the receive end according to step S401 are respectively $r_{m0,n1}$ and $r_{m0,n2}$, and the estimation value $H_0$ of the channel between the transmit antenna port 0 and the receive end is specifically:

$$H_0 = \frac{r_{m0,n1} b_0^0 + r_{m0,n2} b_1^0}{w_0} \quad (10)$$

The estimation value $H_1$ of the channel between the transmit antenna port 1 and the receive end is specifically:

$$H_1 = \frac{r_{m0,n1} b_0^1 + r_{m0,n2} b_1^1}{w_1} \quad (11)$$

Figure 6:
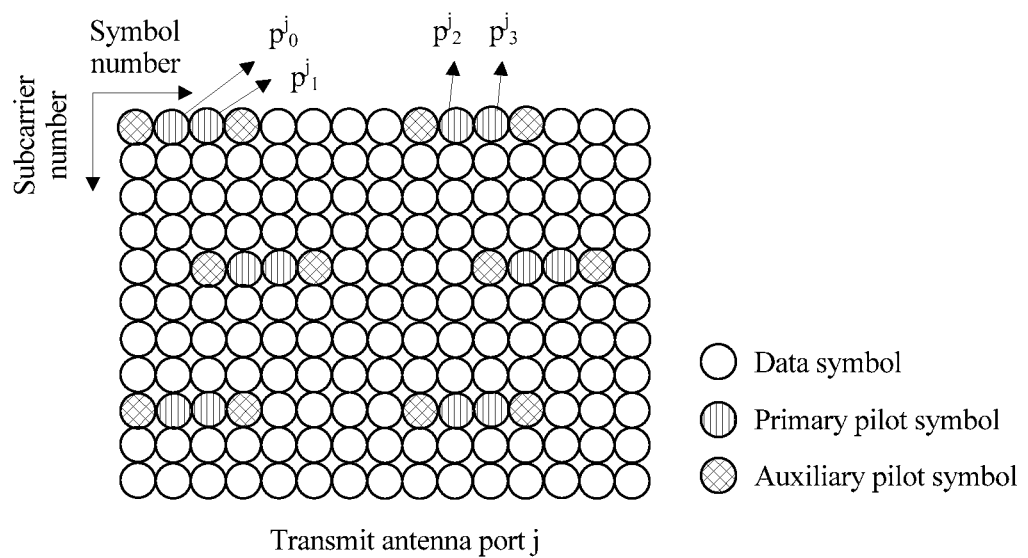
FIG. 6 is another specific distribution pattern of pilot symbol groups disclosed in an embodiment of the present disclosure.

Four transmit antenna ports are used as examples. Pilot symbol groups on different antenna ports at the transmit end have same distribution. FIG. 6 shows a distribution pattern of pilot symbol groups on an antenna port j. A transmit value of an auxiliary pilot symbol in the pilot symbol group is calculated by using the pilot sending method described in the foregoing embodiment of the present disclosure, so as to cancel interference caused by data symbols surrounding a primary pilot symbol to the primary pilot symbol. As shown in FIG. 6, primary pilot symbols in two pilot symbol groups on a same subcarrier on the transmit antenna port j are respectively represented as $p^j_0$, $p^j_1$, $p^j_2$, and $p^j_3$, and a transmit matrix P that includes primary pilot symbols on the four transmit antenna ports is indicated in the following:

$$P = \begin{pmatrix} p_0^0 & p_1^0 & p_2^0 & p_3^0 \\ p_0^1 & p_1^1 & p_2^1 & p_3^1 \\ p_0^2 & p_1^2 & p_2^2 & p_3^2 \\ p_0^3 & p_1^3 & p_2^3 & p_3^3 \end{pmatrix}.$$

The interference response matrix $\Gamma$ for the time-frequency resource locations at which the primary pilot symbols are located is indicated in the following:

$$\Gamma = \begin{pmatrix} 1 & -\gamma & 0 & 0 \\ \gamma & 1 & 0 & 0 \\ 0 & 0 & 1 & \gamma \\ 0 & 0 & \gamma & 1 \end{pmatrix}.$$

A receiving sequence $(b^j_0, b^j_1, b^j_2, b^j_3)^T$ of the transmit antenna port j is indicated in the following:

$$(b_0^j b_1^j b_2^j b_3^j)^T = \Gamma^{-1} P^{-1} \alpha_j \quad (12)$$

In the formula, $\alpha_j$ indicates a column vector in which the $j^{th}$ element is a non-zero element, and the non-zero element of the column vector is pilot channel estimation gain power $W_j$ of the $j^{th}$ antenna port. In this case, an estimation value of a channel between the transmit antenna port j and a receive antenna port i is:

$$H_{ij} = \frac{\sum_{k=0}^{3} b_k^j r_k^j}{w_j} \quad (13)$$

With reference to the pilot sending method in the foregoing embodiment, this embodiment of the present disclosure brings beneficial effects from three aspects by implementing the channel estimation method: First, pilot overheads are reduced. Compared with an IAM solution, the pilot overheads are reduced by 60%. Second, a power increase of an auxiliary pilot symbol is reduced. Statistically, a power increase of an auxiliary pilot is reduced by $$\frac{\gamma^2}{1-\gamma^2}.$$

Figure 7:
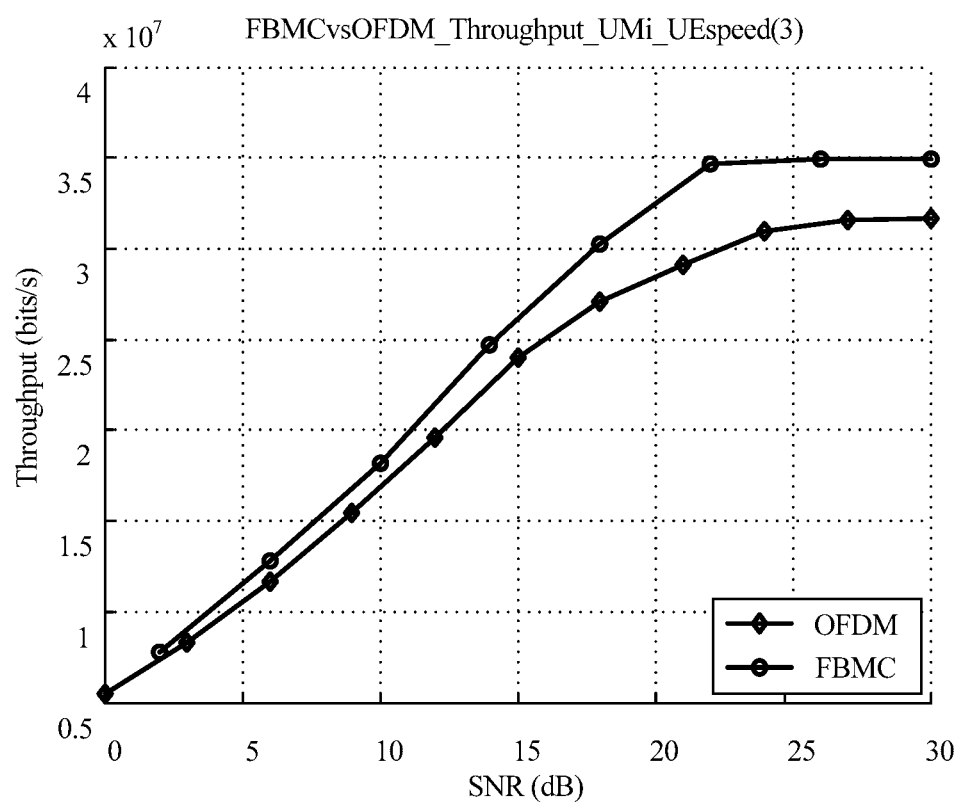
FIG. 7 is a throughput emulation result of an FBMC system that uses an FBMC-based pilot sending method and a channel estimation method disclosed in embodiments of the present disclosure.

For example, a power increase of an auxiliary pilot is reduced by 24% for an IOTA filter. Third, channel estimation performance is improved. As shown in FIG. 7, an FBMC system can obtain accurate channel estimation by using the pilot solution described in the present disclosure. In addition, compared with an OFDM system, the FBMC system can ensure that about 15% gains are brought to an FBMC link because a power increase of an auxiliary pilot symbol and pilot overheads are reduced.

Figure 8:
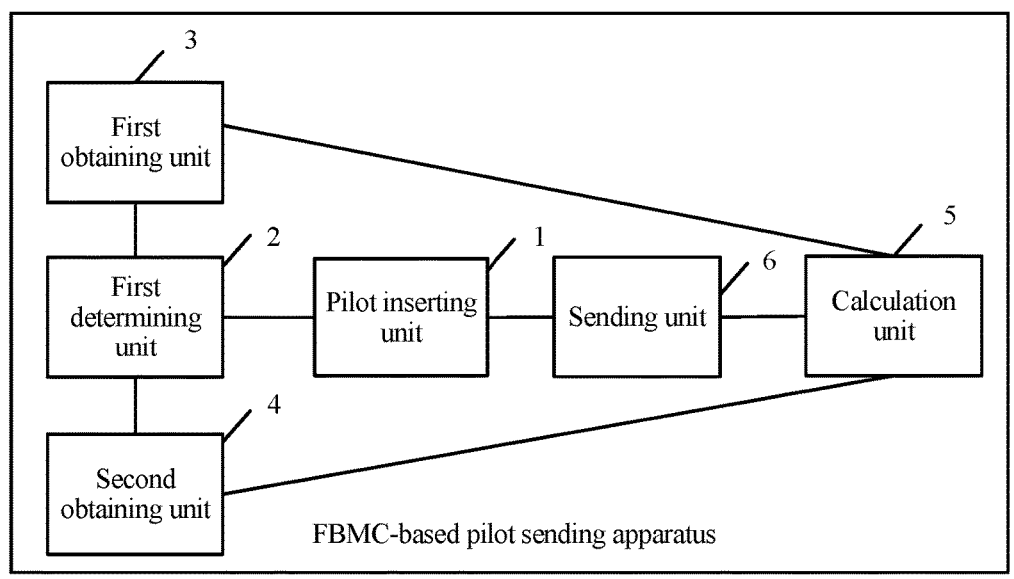
FIG. 8 is a schematic structural diagram of an FBMC-based pilot sending apparatus disclosed in an embodiment of the present disclosure.

Referring to FIG. 8, FIG. 8 is a schematic structural diagram of an FBMC-based pilot sending apparatus disclosed in an embodiment of the present disclosure. As shown in FIG. 8, the apparatus includes the following units: a pilot inserting unit 1, a first determining unit 2, a first obtaining unit 3, a second obtaining unit 4, a calculation unit 5, and a sending unit 6.

The pilot inserting unit 1 is configured to: for each transmit antenna port, insert a pilot symbol group at four consecutive FBMC time-frequency resource locations. The pilot symbol group includes two auxiliary pilot symbols and two primary pilot symbols.

The pilot inserting unit 1 may be configured to perform the method in step S201. The pilot inserting unit 1 may insert a corresponding quantity of pilot symbol groups on each transmit antenna port according to a coherence time and coherence bandwidth of a system, to determine distribution density of pilot symbol groups.

For example, locations of pilot symbols in pilot symbol groups inserted on a transmit antenna port j by the pilot inserting unit 1 are shown in a pilot pattern in FIG. 2. The pilot pattern includes a first auxiliary pilot symbol $a^j_{m0,n0}$, a first primary pilot symbol $p^j_{m0,n1}$, a second primary pilot symbol $p^j_{m0,n2}$, and a second auxiliary pilot symbol $a^j_{m0,n3}$.

The first determining unit 2 is configured to: for each primary pilot symbol inserted by the pilot inserting unit 1, determine a time-frequency resource location range in which the primary pilot symbol is interfered with.

In an optional implementation manner, that the first determining unit 2 determines the time-frequency resource location range in which each primary pilot symbol is interfered with at another time-frequency resource location may be determining, for each primary pilot symbol in the pilot symbol group according to multiplex converter response data and a time-frequency resource location of the primary pilot symbol, the time-frequency resource location range in which the primary pilot symbol is interfered with.

In another optional implementation manner, the first determining unit 2 may obtain a preset time-frequency resource location range in which the primary pilot symbol is interfered with. For example, once an FBMC or MIMO-FBMC system is determined, a filter or an overlapping factor that is used by the system is determined, that is, the time-frequency resource location range in which the primary pilot symbol is interfered with is determined. To reduce operation load of a transmit end, the time-frequency resource location range may be built into the system. Once the system is started, the first determining unit 2 can obtain the time-frequency resource location range for each primary pilot symbol.

In another optional implementation manner, the first determining unit 2 may determine, based on an interference estimation algorithm, the time-frequency resource location range in which the primary pilot symbol is interfered with.

The first obtaining unit 3 is configured to: for each primary pilot symbol, obtain transmit values of data symbols at time-frequency resource locations in the time-frequency resource location range that is determined by the first determining unit 2 and is corresponding to the primary pilot symbol.

The second obtaining unit 4 is configured to: for each primary pilot symbol, obtain, according to multiplex converter response data, interference coefficient values of interference caused at the time-frequency resource locations to the primary pilot symbol, where the time-frequency resource locations are in the time-frequency resource location range that is determined by the first determining unit 2 and that is corresponding to the primary pilot symbol.

In an optional implementation manner, the second obtaining unit 4 may obtain, according to an FBMC multiplex converter response, the interference coefficient values of the interference caused at the time-frequency resource locations to the primary pilot symbol, where the time-frequency resource locations are in the determined time-frequency resource location range corresponding to the primary pilot symbol. For example, Table 1 is a multiplex converter response (which uses an IOTA filter) in an FBMC system, and is used to indicate receive values, at time-frequency resource locations of a receive end, that are obtained when a transmit value at a central time-frequency resource location (0, 0) is 1 and transmit values at other time-frequency resource locations are 0. Rows in Table 1 indicate subcarrier numbers, columns indicate numbers of FBMC symbols in a time domain, and elements in the table are multiplex converter response data in an FBMC system. If the primary pilot symbol is sent at the central time-frequency resource location (0, 0), the time-frequency resource location range that is determined by the first determining unit 2 and in which the primary pilot symbol is interfered with is 3×3. That is, symbols in a range with two left symbols adjacent to the primary pilot symbol, two right symbols adjacent to the primary pilot symbol, two adjacent subcarriers above the primary pilot symbol, and two adjacent subcarriers below the primary pilot symbol cause interference to the primary pilot symbol. In this case, an interference coefficient value that is obtained by the second obtaining unit 4 and is of interference caused by a symbol sent at a time-frequency resource location (m, n) to the primary pilot symbol sent at the central time-frequency resource location is response data at a location (−m, −n) in Table 1. For example, as shown in Table 1, an interference value caused at a time-frequency resource location (−1, −1) to the central time-frequency resource location (0, 0) is 0.2280j.

In another optional implementation manner, the second obtaining unit 4 may determine an interference coefficient table according to multiplex converter response data, and obtain, from the interference coefficient table, the interference coefficient values of the interference caused at the time-frequency resource locations to the primary pilot symbol, where the time-frequency resource locations are in the determined time-frequency resource location range corresponding to the primary pilot symbol. For example, Table 2 is an interference coefficient table obtained by the second obtaining unit 4 according to Table 1, and is used to represent interference coefficient values of interference caused at other time-frequency resource locations to the central time-frequency resource location (0, 0). Optionally, an interference coefficient table of the filter may be stored in the FBMC system in advance. In this way, the interference coefficient values of the interference caused to the primary pilot symbol may be directly determined according to the interference coefficient table and the determined time-frequency resource location range in which the primary pilot symbol is interfered with.

In still another optional implementation manner, the interference coefficient table may be preset in a system. The second obtaining unit 4 directly obtains, according to the preset interference coefficient table, the interference coefficient values of the interference caused at the time-frequency resource locations to the primary pilot symbol, where the time-frequency resource locations are in the determined time-frequency resource location range corresponding to the primary pilot symbol.

For an FBMC system, if a primary pilot symbol, in a pilot symbol group, that is used for channel estimation and is sent at a time-frequency resource location $(m_0, n_1)$ on a transmit antenna port j is $p^j_{m_0,n_1}$, a receive symbol at the time-frequency resource location on a receive antenna port i of a receive end is $\gamma_{m_0,n_1}^i$ in the formula (1).

To improve channel estimation performance, as shown in a part of the formula (2), interference caused to the primary pilot symbol by data symbols in the time-frequency resource location range in which the primary pilot symbol is interfered with needs to be offset by using an auxiliary pilot symbol. Specifically, after execution performed by the first obtaining unit 3 and the second obtaining unit 4 is completed, the following calculation unit 5 achieves this effect.

The calculation unit 5 is configured to calculate a transmit value of each auxiliary pilot symbol in the pilot symbol group according to the interference coefficient values obtained by the second obtaining unit 4 and the transmit values that are obtained by the first obtaining unit 3 and are of the data symbols corresponding to each primary pilot symbol.

Specifically, the calculation unit 5 may be configured to calculate the transmit value of each auxiliary pilot symbol in the pilot symbol group by performing methods in steps S204 to S206.

The sending unit 6 is configured to send the pilot symbol group. The pilot symbol group includes the transmit values that are of the auxiliary pilot symbols and are calculated by the calculation unit 5.

Specifically, after calculating the transmit values of all the auxiliary pilot symbols in the pilot symbol group, the sending unit 6 sends the pilot symbol group inserted on the transmit antenna port, so that after receiving a signal, a receive end performs channel estimation according to primary pilot symbols in pilot symbol groups, on a receive antenna port, that are sent by the sending unit 6 from each transmit antenna port. Further, the sending unit 6 sends primary pilot symbols on different transmit antenna ports in a code division manner.

In this embodiment of the present disclosure, a pilot inserting unit 1 inserts a pilot symbol group on a transmit antenna port, where two auxiliary pilot symbols and two primary pilot symbols in the pilot symbol group are sequentially inserted at corresponding time-frequency resource locations. Then, for each primary pilot symbol, a first determining unit 2 determines a time-frequency resource location range in which the primary pilot symbol is interfered with, and a first obtaining unit 3 obtains transmit values of data symbols at time-frequency resource locations in the time-frequency resource location range. A second obtaining unit determines, according to multiplex converter response data, interference coefficient values caused at the time-frequency resource locations in the time-frequency resource location range to the primary pilot symbol. A calculation unit 5 determines a transmit value of an auxiliary pilot symbol adjacent to the primary pilot symbol according to the transmit values that are obtained by the first obtaining unit 3 and are of the data symbols in the time-frequency resource location range and the corresponding interference coefficient values obtained by the second obtaining unit 4. Therefore, after a sending unit 6 sends the pilot symbol group (the pilot symbol group includes the calculated transmit values of the auxiliary pilot symbols), interference caused by the data symbols at the time-frequency resource locations in the time-frequency resource location range to the primary pilot symbol may be effectively cancelled for a receive value that is obtained by a receive end and is at a time-frequency resource location at which the primary pilot symbol is located, thereby laying a foundation for improving channel estimation performance. In addition, a power increase can be effectively reduced by using the auxiliary pilot symbols respectively adjacent to the two primary pilot symbols in the pilot symbol group.

Figure 9:
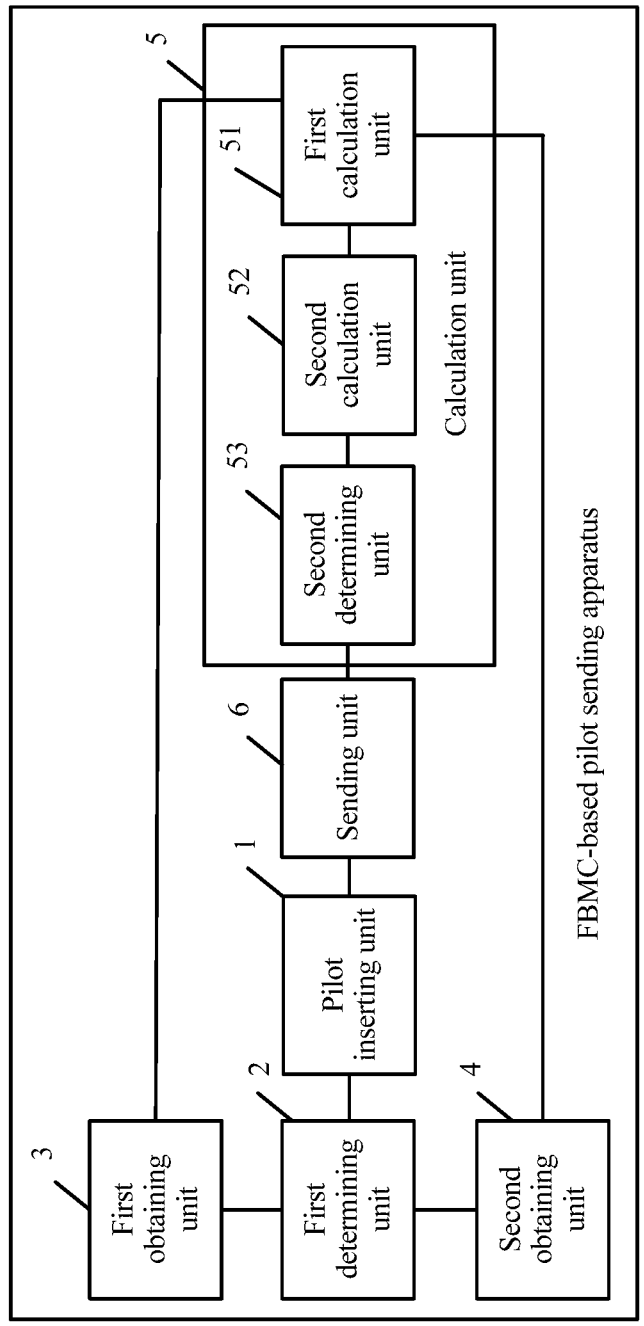
FIG. 9 is a schematic structural diagram of another FBMC-based pilot sending apparatus disclosed in an embodiment of the present disclosure.

Referring to FIG. 9, FIG. 9 is a schematic structural diagram of another FBMC-based pilot sending apparatus. The FBMC-based pilot sending apparatus shown in FIG. 9 is obtained by optimizing the FBMC-based pilot sending apparatus shown in FIG. 8. As shown in FIG. 9, the apparatus includes the following units: a pilot inserting unit 1, a first determining unit 2, a first obtaining unit 3, a second obtaining unit 4, a calculation unit 5, and a sending unit 6.

The pilot inserting unit 1 is configured to: for each transmit antenna port, insert a pilot symbol group at four consecutive FBMC time-frequency resource locations. The pilot symbol group includes two auxiliary pilot symbols and two primary pilot symbols.

The first determining unit 2 is configured to: for each primary pilot symbol inserted by the pilot inserting unit 1, determine a time-frequency resource location range in which the primary pilot symbol is interfered with.

The first obtaining unit 3 is configured to: for each primary pilot symbol, obtain transmit values of data symbols at time-frequency resource locations, where the time-frequency resource locations are in the time-frequency resource location range that is determined by the first determining unit and that is corresponding to the primary pilot symbol.

The second obtaining unit 4 is configured to: for each primary pilot symbol, obtain, according to multiplex converter response data, interference coefficient values of interference caused at the time-frequency resource locations to the primary pilot symbol, where the time-frequency resource locations are in the time-frequency resource location range that is determined by the first determining unit 2 and that is corresponding to the primary pilot symbol.

The calculation unit 5 includes:

a first calculation unit 51, configured to: for an auxiliary pilot symbol adjacent to the primary pilot symbol in the pilot symbol group, add up values obtained after separately multiplying the transmit values that are obtained by the first obtaining unit 3 and are of the data symbols corresponding to each primary pilot symbol by the interference coefficient values that are obtained by the second obtaining unit 4 and are of the interference caused at the time-frequency resource locations corresponding to the data symbols to the primary pilot symbol, and use the calculated added result as a first result;

a second calculation unit 52, configured to: divide the first result calculated by the first calculation unit 51 by an interference coefficient value of interference caused at a time-frequency resource location of the auxiliary pilot symbol to the primary pilot symbol, and use the calculated result as a second result; and a second determining unit 53, configured to determine a value obtained after the second result calculated by the second calculation unit is negated as the transmit value of the auxiliary pilot symbol.

Specifically, the calculation unit 5 may use the formula (3) to calculate transmit values of a first auxiliary pilot symbol and a second auxiliary pilot symbol in the pilot symbol group inserted by the pilot inserting unit 1.

The sending unit 6 is configured to send the pilot symbol group. The pilot symbol group includes the transmit values that are of the auxiliary pilot symbols and are calculated by the calculation unit 5. The sending unit 6 sends primary pilot symbols on different transmit antenna ports in a code division manner.

In this embodiment of the present disclosure, a pilot inserting unit inserts, on a transmit antenna port, a pilot symbol group that includes a first auxiliary pilot symbol, a first primary pilot symbol, a second primary pilot symbol, and a second auxiliary pilot symbol at consecutive locations, so as to reduce a power increase caused by an auxiliary pilot symbol. A first determining unit determines a time-frequency resource location range that is preset in an FBMC system and in which the primary pilot symbol in the pilot symbol group is interfered with, a first obtaining unit obtains transmit values of data symbols in the time-frequency resource location range, and a second obtaining unit obtains interference coefficient values, so that a calculation unit calculates a transmit value of the auxiliary pilot symbol in the pilot symbol group, thereby cancelling interference caused by the data symbols in the time-frequency resource location range to the primary pilot symbol, and further improving channel estimation performance.

Figure 10:
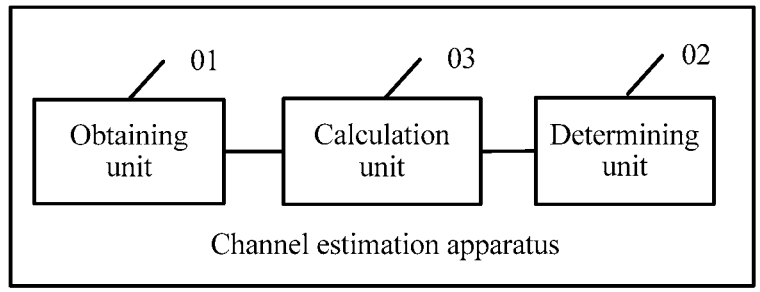
FIG. 10 is a schematic structural diagram of a channel estimation apparatus disclosed in an embodiment of the present disclosure.

Referring to FIG. 10, FIG. 10 is a schematic structural diagram of a channel estimation apparatus disclosed in an embodiment of the present disclosure. As shown in FIG. 10, the apparatus includes the following units: an obtaining unit 01, a determining unit 02, and a calculation unit 03.

The obtaining unit 01 is configured to obtain receive values at time-frequency resource locations at which primary pilot symbols sent from each transmit antenna port to each receive antenna port are located, where interference caused by other data symbols to the primary pilot symbols is cancelled for the receive values by using corresponding auxiliary pilot symbols.

The determining unit 02 is configured to determine a receiving sequence from each transmit antenna port to each receive antenna port.

In an optional implementation manner, the determining unit 02 may be configured to determine the receiving sequence from each transmit antenna port to each receive antenna port by performing the method in steps S402 to S404.

Further, when determining the receiving sequence from each transmit antenna port to each receive antenna port by performing the method in steps S402 to S404, the determining unit 02 further needs to obtain pilot channel estimation gain power of the transmit antenna port on each receive antenna port, to calculate the receiving sequence of the transmit antenna port.

In an optional implementation manner, the determining unit 02 may obtain, by using the following steps, an interference response matrix required in a process of determining the receiving sequence: The determining unit 02 receives an interference response matrix indication message, sent by the transmit end, for the time-frequency resource locations at which the primary pilot symbols are located; and determines, from the interference response matrix indication message, the interference response matrix for the time-frequency resource locations at which the primary pilot symbols sent by the transmit end are located.

In another optional implementation manner, the determining unit 02 may obtain, by using the following steps, an interference response matrix required in a process of determining the receiving sequence: The determining unit 02 determines time-frequency resource locations, in a pilot symbol group, at which the primary pilot symbols at the transmit end are interfered with (only interference between adjacent primary pilot symbols is considered for the time-frequency resource locations determined by the determining unit 02); obtains interference coefficient values of interference caused at the time-frequency resource locations corresponding to the primary pilot symbols to the primary pilot symbols; and constructs the interference response matrix by using the interference coefficient values. The determining unit 02 may directly obtain, from an interference range indication message sent by the transmit end, the time-frequency resource locations that are in the pilot symbol group and at which the primary pilot symbols at the transmit end are interfered with; or the determining unit 02 determines, according to multiplex converter response data and time-frequency resource locations of the primary pilot symbols, the time-frequency resource locations at which the primary pilot symbols are interfered with; or the determining unit 02 determines the interference response matrix by using time-frequency resource locations that are preset in an FBMC system and at which the primary pilot symbols are interfered with.

In addition, that the determining unit 02 obtains, in a process of obtaining the interference response matrix, the interference coefficient values of the interference caused at the time-frequency resource locations corresponding to the primary pilot symbols to the primary pilot symbols may be specifically obtaining, according to the multiplex converter response data, the interference coefficient values of the interference caused at the time-frequency resource locations corresponding to the primary pilot symbols to the primary pilot symbols. Optionally, the determining unit 02 may receive an interference coefficient table indication message sent by the transmit end, and then obtain, from the interference coefficient table indication message, the interference coefficient values of the interference caused at the determined time-frequency resource locations to the primary pilot symbols.

The calculation unit 03 is configured to: for each transmit antenna port to each receive antenna port, calculate an estimation value of a channel between the transmit antenna port and the receive antenna port according to the receive values obtained by the obtaining unit 01 that are of the primary pilot symbols and the receiving sequence determined by the determining unit 02.

Specifically, the calculation unit 03 may be configured to perform the method in steps S405 to S406 to calculate the estimation value of the channel between the transmit antenna port and the receive antenna port.

For each transmit antenna port on each receive antenna port, it is assumed that receive values of primary pilot symbols of the receive antenna port i are respectively $r^j_0$, $r^j_1, \ldots, r^j_n$, where $r^j_n$ is a receive value at a time-frequency resource location at which the $n^{th}$ primary pilot symbol of the receive antenna port i is located, and an estimation value of a channel between the transmit antenna port j and the receive antenna port i is $H_{ij}$. In this case, the estimation value, calculated by the calculation unit 03, of the channel between the transmit antenna port j and the receive antenna port i is specifically:

$$H_{ij}=[r^j_0, r^j_1, \ldots, r^j_{in}][b^j_0, b^j_1, \ldots, b^j_n]^T/w_j.$$

Further, all the units distinguish, in a code division manner, primary pilot symbols that are on different transmit antenna ports and are sent by the transmit end.

In this embodiment of the present disclosure, an obtaining unit obtains receive values at time-frequency resource locations at which primary pilot symbols sent from each transmit antenna port to each receive antenna port are located, where interference caused by other data symbols to the primary pilot symbols is cancelled for the receive values by using the pilot sending method, designed at a transmit end, in the foregoing embodiment. Then, because an FBMC system is a non-orthogonal system, a determining unit needs to determine a receiving sequence from each transmit antenna port to each receive antenna port. Finally, a calculation unit calculates an estimation value of a channel between the transmit antenna port and the receive antenna port according to the received receive values and the receiving sequence. With reference to the pilot sending apparatus in the foregoing embodiment of the present disclosure, the channel estimation apparatus in this embodiment of the present disclosure can effectively decrease transmit power of an auxiliary pilot symbol, thereby reducing a power increase caused by an auxiliary pilot symbol, and optimizing channel estimation performance.

Figure 11:
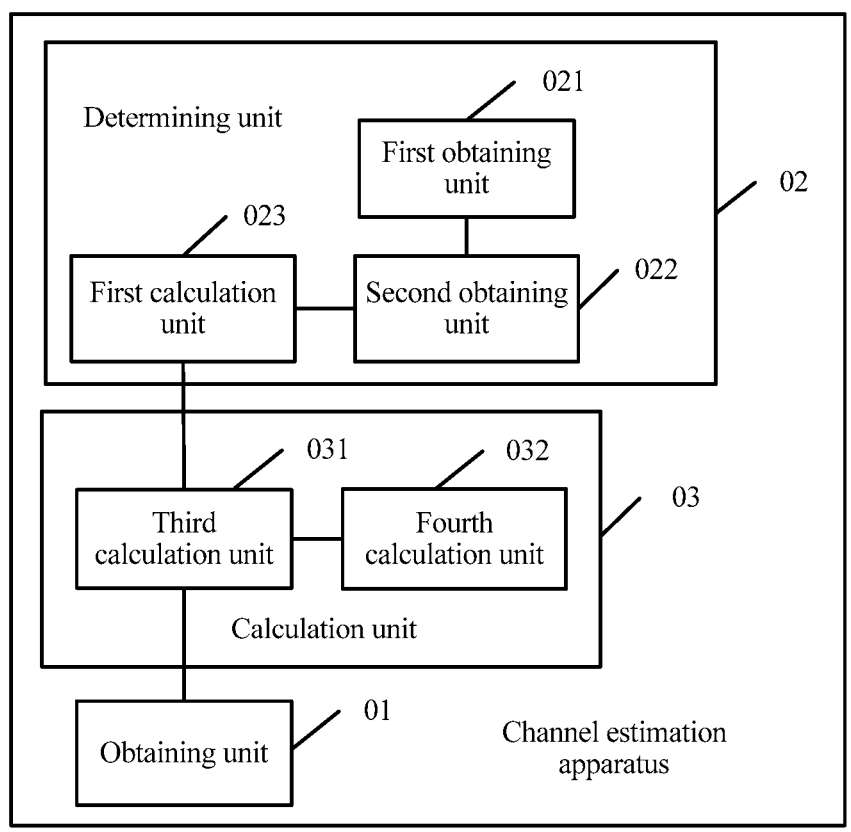
FIG. 11 is a schematic structural diagram of another channel estimation apparatus disclosed in an embodiment of the present disclosure.

Referring to FIG. 11, FIG. 11 is a schematic structural diagram of another channel estimation apparatus disclosed in this embodiment of the present disclosure. The channel estimation apparatus shown in FIG. 10 is obtained by further optimizing the channel estimation apparatus shown in FIG. 10. Specifically, as shown in FIG. 11, the apparatus includes the following units: an obtaining unit 01, determining unit 02, and calculation unit 03.

The obtaining unit 01 is configured to obtain receive values at time-frequency resource locations at which primary pilot symbols sent from each transmit antenna port to each receive antenna port are located, where interference caused by other data symbols to the primary pilot symbols is cancelled for the receive values by using auxiliary pilot symbols.

The determining unit 02 includes:
a first obtaining unit 021, configured to obtain an interference response matrix for the time-frequency resource locations at which the primary pilot symbols at a transmit end are located;
a second obtaining unit 022, configured to obtain a transmit matrix that includes transmit values of primary pilot symbols at the transmit end; and
a first calculation unit 023, configured to calculate the receiving sequence from each transmit antenna port to each receive antenna port according to the interference response matrix and the transmit matrix.

The calculation unit 03 includes:
a third calculation unit 031, configured to: for each transmit antenna port to each receive antenna port, calculate a product of row vectors that include the receive values obtained by the obtaining unit that are of the primary pilot symbols and column vectors that include the receiving sequence that is determined by the determining unit and is of the transmit antenna port; and
a fourth calculation unit 032, configured to: calculate a ratio of a result calculated by the third calculation unit to pilot channel estimation gain power of the transmit antenna port, and use the ratio as an estimation value of a channel between the transmit antenna port and the receive antenna port.

The pilot channel estimation gain power indicates a ratio of joint pilot power for performing channel estimation by a receive end to power of a pilot symbol sent by the transmit end.

The first obtaining unit 021 includes:
a first receiving unit, configured to receive an interference response matrix indication message sent by the transmit end; and
a first determining unit, configured to determine the interference response matrix for the time-frequency resource locations of the primary pilot symbols at the transmit end according to the interference response matrix indication message.

In another optional implementation manner, the first obtaining unit 021 includes:
a second determining unit, configured to determine time-frequency resource locations, in a pilot symbol group, at which the primary pilot symbols at the transmit end are interfered with; and
a second obtaining unit, configured to: obtain interference coefficient values of interference caused at the determined time-frequency resource locations in the pilot symbol group to the primary pilot symbols, and construct the interference response matrix by using the interference coefficient values.

The second determining unit is specifically configured to: for each primary pilot symbol in the pilot symbol group, determine, according to multiplex converter response data and time-frequency resource locations of the primary pilot symbols, the time-frequency resource locations at which the primary pilot symbols are interfered with.

The second determining unit in the first obtaining unit 021 includes:
a second receiving unit, configured to receive an interference indication message sent by the transmit end; and
a third determining unit, configured to determine the time-frequency resource locations, in the pilot symbol group, at which the primary pilot symbols at the transmit end are interfered with.

The second obtaining unit in the first obtaining unit 021 includes:
a third receiving unit, configured to receive an interference coefficient table indication message sent by the transmit end; and
a third obtaining unit, configured to: obtain the interference coefficient values, in the interference coefficient table indication message, of the interference caused at the determined time-frequency resource locations to the primary pilot symbols; and construct the interference response matrix by using the interference coefficient values.

Specifically, for detailed processes in which the channel estimation apparatus calculates estimation values of channels between the receive end and two transmit antenna ports in a 1×2 MIMO-FBMC system and calculates, by using four transmit antenna ports as an example, an estimation value of a channel between the transmit antenna ports and the receive end, refer to content described in the disclosure embodiment corresponding to FIG. 5.

With reference to the pilot sending apparatus in the foregoing embodiment, the channel estimation apparatus in this embodiment of the present disclosure brings beneficial effects from three aspects: First, pilot overheads are reduced. Compared with an IAM solution, the pilot overheads are reduced by 60%. Second, a power increase of an auxiliary pilot symbol is reduced. Statistically, a power increase of an auxiliary pilot is reduced by $$\frac{\gamma^2}{1-\gamma^2}.$$

For example, a power increase of an auxiliary pilot is reduced by 24% for an IOTA filter. Third, channel estimation performance is improved. FIG. 7 shows a throughput emulation result (FBMC vs OFDM_Throughput_UMi-UEspeed) of an FBMC system that uses the pilot solution in the present disclosure. The FBMC system can obtain more accurate channel estimation, and can ensure that about 15% gains are brought to an FBMC link because a power increase of an auxiliary pilot symbol and pilot overheads are reduced.

An embodiment of the present disclosure provides a computer storage medium. The computer storage medium stores a program, and when the program is executed, FBMC-based pilot sending methods described in the foregoing embodiments of the present disclosure are performed.

An embodiment of the present disclosure provides a computer storage medium. The computer storage medium stores a program, and when the program is executed, channel estimation methods described in the foregoing embodiments of the present disclosure are performed.

Figure 12:
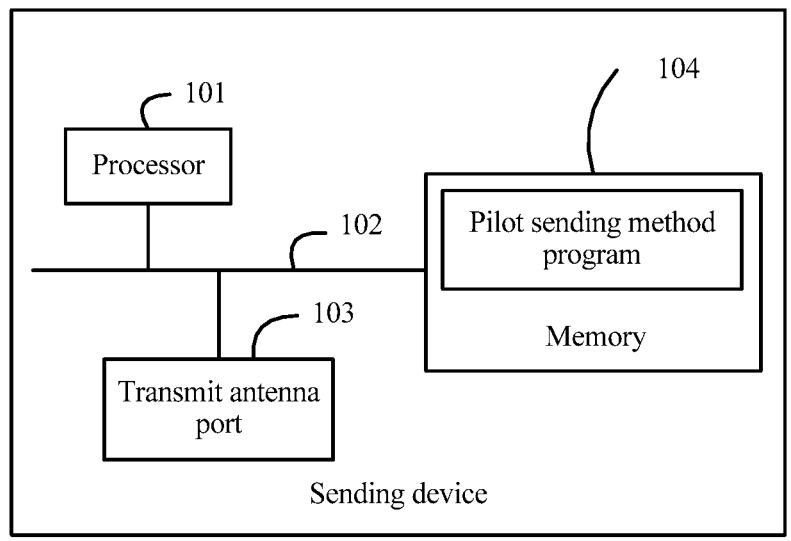
FIG. 12 is a schematic structural diagram of a sending device disclosed in an embodiment of the present disclosure.

FIG. 12 is a schematic structural diagram of a sending device disclosed in an embodiment of the present disclosure. As shown in FIG. 12, the sending device includes a processor 101, at least one transmit antenna port 103 (one transmit antenna port is used as an example in FIG. 12) connected to the processor 101 by using a bus 102, and a memory 104 connected to the processor 101 by using the bus 102. The memory 104 stores a group of program code, and the processor 101 is configured to invoke the program code stored in the memory 104 to perform the following operations:

for each transmit antenna port, inserting a pilot symbol group at four consecutive FBMC time-frequency resource locations, where the pilot symbol group includes two auxiliary pilot symbols and two primary pilot symbols;

for each primary pilot symbol, determining a time-frequency resource location range in which the primary pilot symbol is interfered with;

for each primary pilot symbol, obtaining transmit values of data symbols at time-frequency resource locations in the determined time-frequency resource location range corresponding to the primary pilot symbol;

for each primary pilot symbol, obtaining, according to multiplex converter response data, interference coefficient values of interference caused at the time-frequency resource locations to the primary pilot symbol, where the time-frequency resource locations are in the determined time-frequency resource location range corresponding to the primary pilot symbol;

calculating a transmit value of each auxiliary pilot symbol in the pilot symbol group according to the obtained interference coefficient values and the obtained transmit values of the data symbols corresponding to each primary pilot symbol; and sending the pilot symbol group, where the pilot symbol group includes the calculated transmit values of the auxiliary pilot symbols.

The inserting, by the processor 101, a pilot symbol group at four consecutive FBMC time-frequency resource locations includes:

respectively inserting a first auxiliary pilot symbol, a first primary pilot symbol, a second primary pilot symbol, and a second auxiliary pilot symbol at the $K^{th}$, the $(K+1)^{th}$, the $(K+2)^{th}$, and the $(K+3)^{th}$ FBMC symbol locations on a same subcarrier at the time-frequency resource locations, where K is a natural number; or respectively inserting a first auxiliary pilot symbol, a first primary pilot symbol, a second primary pilot symbol, and a second auxiliary pilot symbol on the $N^{th}$, the $(N+1)^{th}$, the $(N+2)^{th}$, and the $(N+3)^{th}$ FBMC subcarriers at a same FBMC symbol location at the time-frequency resource locations, where N is a natural number.

In an optional implementation manner, the determining, by the processor 101, a time-frequency resource location range in which the primary pilot symbol is interfered with includes:

for each primary pilot symbol in the pilot symbol group, determining, according to the multiplex converter response data and a time-frequency resource location of the primary pilot symbol, the time-frequency resource location range in which the primary pilot symbol is interfered with.

In an optional implementation manner, the determining, by the processor 101, a time-frequency resource location range in which the primary pilot symbol is interfered with includes:

obtaining a preset time-frequency resource location range in which the primary pilot symbol is interfered with.

In an optional implementation manner, the determining, by the processor 101, a time-frequency resource location range in which the primary pilot symbol is interfered with includes:

determining, based on an interference estimation algorithm, the time-frequency resource location range in which the primary pilot symbol is interfered with.

The calculating, by the processor 101, a transmit value of each auxiliary pilot symbol in the pilot symbol group according to the obtained interference coefficient values and the obtained transmit values of the data symbols corresponding to each primary pilot symbol includes:

for an auxiliary pilot symbol adjacent to the primary pilot symbol in the pilot symbol group, adding up values obtained after separately multiplying the obtained transmit values of the data symbols corresponding to the primary pilot symbol and the interference coefficient values of the interference caused at the time-frequency resource locations of the data symbols to the primary pilot symbol, and using the calculated added result as a first result;

dividing the first result by an interference coefficient value of interference caused at a time-frequency resource location of the auxiliary pilot symbol to the primary pilot symbol, and using the calculated result as a second result; and determining a value obtained after the second result is negated as the transmit value of the auxiliary pilot symbol.

Specifically, the processor 101 may calculate transmit values of the first auxiliary pilot symbol and the second auxiliary pilot symbol with reference to the formula (3). Further, the processor 101 sends primary pilot symbols on different transmit antenna ports in a code division manner.

In this embodiment of the present disclosure, a sending device inserts a pilot symbol group on a transmit antenna port, where two auxiliary pilot symbols and two primary pilot symbols in the pilot symbol group are sequentially inserted at corresponding time-frequency resource locations. Then, for each primary pilot symbol, the sending device separately obtains a time-frequency resource location range in which the primary pilot symbol is interfered with and transmit values of data symbols at time-frequency resource locations in the time-frequency resource location range; determines, according to multiplex converter response data, interference coefficient values caused at the time-frequency resource locations in the time-frequency resource location range to the primary pilot symbol; and determines a transmit value of an auxiliary pilot symbol adjacent to the primary pilot symbol according to the transmit values of the data symbols in the time-frequency resource location range and the corresponding interference coefficient values. Therefore, after the pilot symbol group (the pilot symbol group includes the calculated transmit values of the auxiliary pilot symbols) is sent, interference caused by the data symbols at the time-frequency resource locations in the time-frequency resource location range to the primary pilot symbol is effectively cancelled for a transmit value that is obtained by a receive end and is at a time-frequency resource location at which the primary pilot symbol is located, thereby laying a foundation for improving channel estimation performance. In addition, a power increase can be effectively reduced by using auxiliary pilot symbols respectively adjacent to the two primary pilot symbols in the pilot symbol group.

Figure 13:
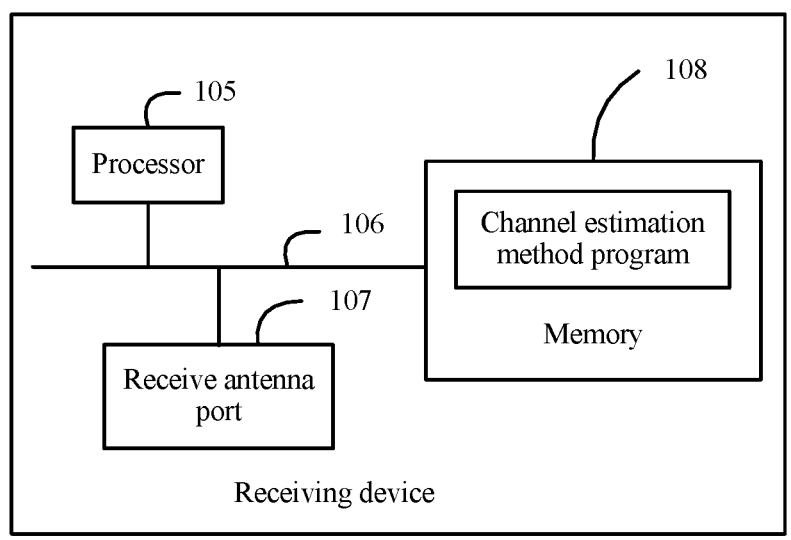
FIG. 13 is a schematic structural diagram of a receiving device disclosed in an embodiment of the present disclosure.

Referring to FIG. 13, FIG. 13 is a schematic structural diagram of a receiving device disclosed in an embodiment of the present disclosure. As shown in FIG. 13, the receiving device includes a processor 105, at least one receive antenna port 107 (one receive antenna port is used as an example in FIG. 13) connected to the processor 105 by using a bus 106, and a memory 108 connected to the processor 105 by using the bus 106. The memory 108 stores a group of program code, and the processor 105 is configured to invoke the program code stored in the memory 108 to perform the following operations:

obtaining receive values at time-frequency resource locations at which primary pilot symbols sent from each transmit antenna port to each receive antenna port are located, where interference caused by other data symbols to the primary pilot symbols is cancelled for the receive values by using corresponding auxiliary pilot symbols;

determining a receiving sequence from each transmit antenna port to each receive antenna port; and calculating, for each transmit antenna port to each receive antenna port, an estimation value of a channel between the transmit antenna port and the receive antenna port according to the receive values of the primary pilot symbols and the receiving sequence.

In an optional implementation manner, the determining, by the processor 105, a receiving sequence from each transmit antenna port to each receive antenna port includes:

determining, according to an indication message received from a transmit end, the receiving sequence from each transmit antenna port to each receive antenna port.

In another optional implementation manner, the determining, by the processor 105, a receiving sequence from each transmit antenna port to each receive antenna port includes:

obtaining an interference response matrix for the time-frequency resource locations at which the primary pilot symbols at a transmit end are located;

obtaining a transmit matrix that includes transmit values of primary pilot symbols at the transmit end; and calculating the receiving sequence from each transmit antenna port to each receive antenna port according to the interference response matrix and the transmit matrix.

Specifically, when the interference response matrix of the transmit end is $\Gamma$, the transmit matrix of the transmit end is P, and a receiving sequence of the transmit antenna port j is $[b^j_0, b^j_1, \ldots, b^j_n]^T$, the calculating, by the processor 105, the receiving sequence of the transmit antenna port is specifically:

$[b^j_0, b^j_1, \ldots, b^j_n]^T = \Gamma^{-1} P^{-1} (0, \ldots, 0, w_j, 0, \ldots, 0)^T$, where $b^j_n$ is a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n−1, $w_j$ in $(0, \ldots, 0, w_j, 0, \ldots, 0)^T$ appears at the $j^{th}$ location, and values at other locations are 0.

Specifically, the calculating, by the processor 105 for each transmit antenna port to each receive antenna port, an estimation value of a channel between the transmit antenna port and the receive antenna port according to the receive values of the primary pilot symbols and the receiving sequence includes:

for each transmit antenna port to each receive antenna port, calculating a product of row vectors that include the receive values of the primary pilot symbols and column vectors that include the receiving sequence of the transmit antenna port; and calculating a ratio of the product result to pilot channel estimation gain power of the transmit antenna port, and using the ratio as the estimation value of the channel between the transmit antenna port and the receive antenna port.

Specifically, for each transmit antenna port on each receive antenna port, when receive values of primary pilot symbols of the receive antenna port i are separately $r^i_0, r^i_1, \ldots, r^i_n$, where $r^i_n$ is a receive value at a time-frequency resource location at which the $n^{th}$ primary pilot symbol of the receive antenna port i is located, and an estimation value of a channel between the transmit antenna port j and the receive antenna port i is $H_{ij}$, the calculating, by the processor 105, an estimation value of a channel between the transmit antenna port j and the receive antenna port i is specifically:

$$H_{ij} = [r^i_0, r^i_1, \ldots, r^i_n][b^j_0, b^j_1, \ldots, b^j_n]^T / w_j.$$

In an optional implementation manner, the obtaining, by the processor 105, an interference response matrix for the time-frequency resource locations of the primary pilot symbols at the transmit end includes:

receiving an interference response matrix indication message sent by the transmit end; and determining the interference response matrix for the time-frequency resource locations of the primary pilot symbols at the transmit end according to the interference response matrix indication message.

In another optional implementation manner, the obtaining, by the processor 105, an interference response matrix for the time-frequency resource locations of the primary pilot symbols at the transmit end includes:

determining time-frequency resource locations, in a pilot symbol group, at which the primary pilot symbols at the transmit end are interfered with;

obtaining interference coefficient values of interference caused at the determined time-frequency resource locations to the primary pilot symbols; and constructing the interference response matrix by using the interference coefficient values.

In an optional implementation manner, the determining, by the processor 105, time-frequency resource locations, in a pilot symbol group, at which the primary pilot symbols at the transmit end are interfered with includes:

for each primary pilot symbol in the pilot symbol group, determining, according to the multiplex converter response data and a time-frequency resource location of the primary pilot symbol, the time-frequency resource location at which the primary pilot symbol is interfered with.

In another optional implementation manner, the determining, by the processor 105, time-frequency resource locations, in a pilot symbol group, at which the primary pilot symbols at the transmit end are interfered with includes:

obtaining preset time-frequency resource locations at which the primary pilot symbols are interfered with.

In still another optional implementation manner, the determining, by the processor 105, time-frequency resource locations, in a pilot symbol group, at which the primary pilot symbols at the transmit end are interfered with includes:

receiving an interference indication message sent by the transmit end; and determining, according to the interference indication message, the time-frequency resource locations, in the pilot symbol group, at which the primary pilot symbols at the transmit end are interfered with.

Specifically, the obtaining, by the processor 105, interference coefficient values of interference caused at the time-frequency resource locations corresponding to the primary pilot symbols to the primary pilot symbols includes:

obtaining, according to the multiplex converter response data, the interference coefficient values of the interference caused at the determined time-frequency resource locations corresponding to the primary pilot symbols to the primary pilot symbols.

In another optional implementation manner, the obtaining, by the processor 105, interference coefficient values of interference caused at the time-frequency resource locations corresponding to the primary pilot symbols to the primary pilot symbols includes:

receiving an interference coefficient table indication message sent by the transmit end; and obtaining the interference coefficient values, in the interference coefficient table indication message, of the interference caused at the determined time-frequency resource locations to the primary pilot symbols.

The receiving device distinguishes, in a code division manner, primary pilot symbols that are on different transmit antenna ports and are sent by the transmit end.

In this embodiment of the present disclosure, a receiving device first obtains receive values at time-frequency resource locations at which primary pilot symbols sent from each transmit antenna port to each receive antenna port are located, where interference caused by other data symbols to the primary pilot symbols is cancelled for the receive values by using the pilot sending method, designed at a transmit end, in the foregoing embodiment. Then, because an FBMC system is a non-orthogonal system, the receiving device needs to determine a receiving sequence from each transmit antenna port to each receive antenna port. Finally, the receiving device calculates an estimation value of a channel between the transmit antenna port and the receive antenna port according to the received receive values and the receiving sequence. With reference to the sending device in the foregoing embodiment of the present disclosure, by using the receiving device in this embodiment of the present disclosure, transmit power of an auxiliary pilot symbol can be effectively decreased, thereby reducing a power increase caused by an auxiliary pilot symbol, and optimizing channel estimation performance.

It should be noted that, for brief description, the foregoing method embodiments are represented as a combination of a sequence of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are exemplary embodiments, and the related actions and modules are not necessarily mandatory to the present disclosure.

Persons of ordinary skill in the art may understand that all or a part of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disk.

The FBMC-based pilot sending method, channel estimation method, and the related apparatus provided in the embodiments of the present disclosure are described in detail above. Principles and implementation manners of the present disclosure are described in this specification by using specific examples. The descriptions about the embodiments are merely provided to help understand the method and core ideas of the present disclosure. In addition, a person of ordinary skill in the art can make modifications to a specific implementation manner and an application scope according to the ideas of the present disclosure. In conclusion, the content of this specification shall not be construed as a limitation on the present disclosure.

What is claimed is:

1. An FBMC-based pilot sending method, comprising:
for each transmit antenna port, inserting a pilot symbol group at four consecutive FBMC time-frequency resource locations, wherein the pilot symbol group comprises two auxiliary pilot symbols and two primary pilot symbols;
for each primary pilot symbol, determining a time-frequency resource location range in which the primary pilot symbol is interfered with;
for each primary pilot symbol, obtaining transmit values of data symbols at time-frequency resource locations in the determined time-frequency resource location range in which the primary pilot symbol is interfered with;
for each primary pilot symbol, obtaining, according to multiplex converter response data, interference coefficient values of interference caused at the time-frequency resource locations to the primary pilot symbol, wherein the time-frequency resource locations are in the determined time-frequency resource location range corresponding to the primary pilot symbol;
calculating a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with; and
sending the pilot symbol group, wherein the pilot symbol group comprises the calculated transmit values of the auxiliary pilot symbols.

2. The method according to claim 1, wherein the inserting a pilot symbol group at four consecutive FBMC time-frequency resource locations comprises:
respectively inserting a first auxiliary pilot symbol, a first primary pilot symbol, a second primary pilot symbol, and a second auxiliary pilot symbol at a $K^{th}$, a $(K+1)^{th}$, a $(K+2)^{th}$, and a $(K+3)^{th}$ FBMC symbol locations on a same subcarrier at the time-frequency resource locations, wherein K is a natural number; or respectively inserting a first auxiliary pilot symbol, a first primary pilot symbol, a second primary pilot symbol, and a second auxiliary pilot symbol on a $N^{th}$, $(N+1)^{th}$, a $(N+2)^{th}$, and a $(N+3)^{th}$ FBMC subcarriers at a same FBMC symbol location at the time-frequency resource locations, wherein N is a natural number.

3. The method according to claim 1, wherein the calculating a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with comprises:

for an auxiliary pilot symbol adjacent to the primary pilot symbol in the pilot symbol group, adding up values obtained after separately multiplying the obtained transmit values of the data symbols corresponding to the primary pilot symbol by the interference coefficient values of the interference caused at the time-frequency resource locations of the data symbols to the primary pilot symbol, and using the calculated added result as a first result;

dividing the first result by an interference coefficient value of interference caused at a time-frequency resource location of the auxiliary pilot symbol to the primary pilot symbol, and using the calculated result as a second result; and determining a value obtained after the second result is negated as the transmit value of the auxiliary pilot symbol.

4. The method according to claim 3, wherein:

when time-frequency resource locations at which the first auxiliary pilot symbol, the first primary pilot symbol, the second primary pilot symbol, and the second auxiliary pilot symbol in the pilot symbol group are located are $(m_k,n_k),(m_k,n_{k+1}),(m_k,n_{k+2}),(m_k,n_{k+3})$; a time-frequency resource location range in which the first primary pilot symbol is interfered with is $\check{\Omega}_{m_k,n_{k+1}}$; a time-frequency resource location range in which the second primary pilot symbol is interfered with is $\check{\Omega}_{m_k,n_{k+2}}$; the first auxiliary pilot symbol and the second auxiliary pilot symbol of a transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k,n-n_{k+1})}$, wherein the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k,n-n_{k+2})}$, wherein the time-frequency resource location (m, n) is in the time-frequency resource location range corresponding to the second primary pilot symbol, transmit values of the first auxiliary pilot symbol $a_{m_k,n_k}^j$ and the second auxiliary pilot symbol $a_{m_k,n_{k+3}}^j$ in the pilot symbol group are specifically:

$$a_{m_k,n_k}^j = -\frac{\left(\sum_{(m,n)\in\check{\Omega}_{m_k,n_{k+1}}} a_{mn}^j \zeta_{(m-m_k,n-n_{k+1})}\right)}{\zeta_{(m_k-m_k,n_k-n_{k+1})}}$$

$$a_{m_k,n_{k+3}}^j = -\frac{\left(\sum_{(m,n)\in\check{\Omega}_{m_k,n_{k+2}}} a_{mn}^j \zeta_{(m-m_k,n-n_{k+2})}\right)}{\zeta_{(m_k-m_k,n_{k+3}-n_{k+2})}}$$

wherein $\check{\Omega}_{m_k,n_{k+1}} = \{(m,n), \zeta_{(m-m_k,n-n_{k+1})} \neq 0, \text{ and } (m,n) \neq \{(m_k,n_k),(m_k,n_{k+1}),(m_k,n_{k+2})\}\}$, $\check{\Omega}_{m_k,n_{k+2}} = \{(m,n), \zeta_{(m-m_k,n-n_{k+2})} \neq 0, \text{ and } (m,n) \neq \{(m_k,n_{k+3}),(m_k,n_{k+1}),(m_k,n_{k+2})\}\}$.

5. A channel estimation method, comprising:

for each receiving antenna port, receiving a pilot symbol group, wherein the pilot symbol group comprises two auxiliary pilot symbols and two primary pilot symbols, the auxiliary pilot symbols are configured to cancel interference caused by other data symbols to the primary pilot symbols;

obtaining receive values at time-frequency resource locations at which primary pilot symbols from each transmit antenna port to each receive antenna port are located, wherein the interference caused by the other data symbols to the primary pilot symbols is cancelled for the receive values by using the auxiliary pilot symbols;

determining a receiving sequence from each transmit antenna port to each receive antenna port; and calculating, for each transmit antenna port to each receive antenna port, an estimation value of a channel between the transmit antenna port and the receive antenna port according to the receive values of the primary pilot symbols and the receiving sequence.

6. The method according to claim 5, wherein the determining a receiving sequence from each transmit antenna port to each receive antenna port comprises:

obtaining an interference response matrix for the time-frequency resource locations at which the primary pilot symbols at a transmit end are located;

obtaining a transmit matrix that comprises transmit values of the primary pilot symbols at the transmit end; and calculating the receiving sequence from each transmit antenna port to each receive antenna port according to the interference response matrix and the transmit matrix.

7. The method according to claim 6, wherein when the interference response matrix of the transmit end is Γ, the transmit matrix of the transmit end is P, and a receiving sequence of a transmit antenna port j is $[b_0^j, b_1^j, \ldots, b_n^j]^T$, the calculating the receiving sequence of the transmit antenna port is specifically:

$[b_0^j, b_1^j, \ldots, b_n^j]^T = \Gamma^{-1}P^{-1}(0, \ldots, 0, w_j, 0, \ldots, 0)^T$, wherein $b_n^j$ is an element in a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n−1, $w_j$ in $(0, \ldots, 0, w_j, 0, \ldots, 0)^T$ appears at the $j^{th}$ location, and values at other locations are 0.

8. The method according to claim 6, wherein the obtaining an interference response matrix for the time-frequency resource locations at which the primary pilot symbols at a transmit end are located comprises:

receiving an interference response matrix indication message sent by the transmit end; and

47 determining, according to the interference response matrix indication message, the interference response matrix for the time-frequency resource locations at which the primary pilot symbols at the transmit end are located.

9. The method according to claim 6, wherein the obtaining an interference response matrix for the time-frequency resource locations at which the primary pilot symbols at a transmit end are located comprises:
    determining time-frequency resource locations of primary pilot symbols that is in a pilot symbol group and that cause interference to the primary pilot symbols at the transmit end;
    obtaining interference coefficient values of interference caused at the determined time-frequency resource locations of the primary pilot symbols in the pilot symbol group to the primary pilot symbols; and
    constructing the interference response matrix by using the interference coefficient values.

10. The method according to claim 5, wherein the calculating, for each transmit antenna port to each receive antenna port, an estimation value of a channel between the transmit antenna port and the receive antenna port according to the receive values of the primary pilot symbols and the receiving sequence comprises:
    for each transmit antenna port to each receive antenna port, calculating a product of row vectors that comprise the receive values of the primary pilot symbols and column vectors that comprise the receiving sequence of the transmit antenna port; and
    calculating a ratio of the product result to pilot channel estimation gain power of the transmit antenna port, and using the ratio as the estimation value of the channel between the transmit antenna port and the receive antenna port.

11. The method according to claim 10, wherein for each transmit antenna port on each receive antenna port, when receive values of primary pilot symbols of a receive antenna port i are separately $r^i_0, r^i_1, \ldots, r^i_n$, wherein $r^i_n$ is a receive value at a time-frequency resource location at which the $n^{th}$ primary pilot symbol of the receive antenna port i is located, and an estimation value of a channel between the transmit antenna port j and the receive antenna port i is $H_{ij}$, the calculating an estimation value of a channel between the transmit antenna port and the receive antenna port is specifically:

$$H_{ij}=[r^i_0, r^i_1, \ldots, r^i_n][b^j_0, b^j_0, b^j_1, \ldots, b^j_n]^T/w_j.$$

12. A sending device, comprising: a processor, at least one transmit antenna port connected to the processor by using an interface, and a memory connected to the processor by using a bus, wherein the memory stores a group of program code, and the processor is configured to invoke the program code stored in the memory to perform the following operations:
    for each transmit antenna port, inserting a pilot symbol group at four consecutive FBMC time-frequency resource locations, wherein the pilot symbol group comprises two auxiliary pilot symbols and two primary pilot symbols;
    for each primary pilot symbol, determining a time-frequency resource location range in which the primary pilot symbol is interfered with;
    for each primary pilot symbol, obtaining transmit values of data symbols at time-frequency resource locations in the determined time-frequency resource location range in which the primary pilot symbol is interfered with;

48 for each primary pilot symbol, obtaining, according to multiplex converter response data, interference coefficient values of interference caused at the time-frequency resource locations to the primary pilot symbol, wherein the time-frequency resource locations are in the determined time-frequency resource location range corresponding to the primary pilot symbol;
    calculating a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with; and
    sending the pilot symbol group, wherein the pilot symbol group comprises the calculated transmit values of the auxiliary pilot symbols.

13. The sending device according to claim 12, wherein the inserting, by the processor, a pilot symbol group at four consecutive FBMC time-frequency resource locations comprises:
    respectively inserting a first auxiliary pilot symbol, a first primary pilot symbol, a second primary pilot symbol, and a second auxiliary pilot symbol at a $K^{th}$, a $(K+1)^{th}$, a $(K+2)^{th}$, and a $(K+3)^{th}$ FBMC symbol locations on a same subcarrier at the time-frequency resource locations, wherein K is a natural number; or respectively inserting a first auxiliary pilot symbol, a first primary pilot symbol, a second primary pilot symbol, and a second auxiliary pilot symbol on a $N^{th}$, a $(N+1)^{th}$, a $(N+2)^{th}$, and a $(N+3)^{th}$ FBMC subcarriers at a same FBMC symbol location at the time-frequency resource locations, wherein N is a natural number.

14. The sending device according to a claim 12, wherein the calculating, by the processor, a transmit value of each auxiliary pilot symbol in the pilot symbol group according to the obtained interference coefficient values and the obtained transmit values of the data symbols at the time-frequency resource locations in the time-frequency resource location range in which each primary pilot symbol is interfered with comprises:
    for an auxiliary pilot symbol adjacent to the primary pilot symbol in the pilot symbol group, adding up values obtained after separately multiplying the obtained transmit values of the data symbols corresponding to the primary pilot symbol by the interference coefficient values of the interference caused at the time-frequency resource locations of the data symbols to the primary pilot symbol, and using the calculated added result as a first result;
    dividing the first result by an interference coefficient value of interference caused at a time-frequency resource location of the auxiliary pilot symbol to the primary pilot symbol, and using the calculated result as a second result; and
    determining a value obtained after the second result is negated as the transmit value of the auxiliary pilot symbol.

15. The sending device according to claim 14, wherein when time-frequency resource locations at which the first auxiliary pilot symbol, the first primary pilot symbol, the second primary pilot symbol, and the second auxiliary pilot symbol in the pilot symbol group are located are $(m_k,n_k)$, $(m_k,n_{k+1}),(m_k,n_{k+2}),(m_k,n_{k+3})$; a time-frequency resource location range in which the first primary pilot symbol is interfered with is $\check{\Omega}_{m_k n_{k+1}}$; a time-frequency resource location range in which the second primary pilot symbol is interfered with is $\check{\Omega}_{m_k n_{k+2}}$; the first auxiliary pilot symbol and the second auxiliary pilot symbol of a transmit antenna port j are respectively $a_{m_k,n_k}^j$ and $a_{m_k,n_{k+3}}^j$; a transmit value of a data symbol at a time-frequency resource location (m, n) on the transmit antenna port j is $a_{m,n}^j$; an interference coefficient value of interference caused at the time-frequency resource location (m, n) to the first primary pilot symbol is $\zeta_{(m-m_k, n-n_{k+1})}$, wherein the time-frequency resource location (m, n) is in the time-frequency resource location range corresponding to the first primary pilot symbol; and an interference coefficient value of interference caused at the time-frequency resource location (m, n) to the second primary pilot symbol is $\zeta_{(m-m_k, n-n_{k+2})}$, wherein the time-frequency resource location (m, n) is in the time-frequency resource location range corresponding to the second primary pilot symbol, transmit values of the first auxiliary pilot symbol $a_{m_k,n_k}^j$ and the second auxiliary pilot symbol $a_{m_k,n_{k+3}}^j$ in the pilot symbol group are specifically:

$$a_{m_k,n_k}^j = -\frac{\left(\sum_{(m,n)\in \check{\Omega}_{m_k n_{k+1}}} a_{mn}^j \zeta_{(m-m_k, n-n_{k+1})}\right)}{\zeta_{(m_k-m_k, n_k-n_{k+1})}}$$

$$a_{m_k,n_{k+3}}^j = -\frac{\left(\sum_{(m,n)\in \check{\Omega}_{m_k n_{k+2}}} a_{mn}^j \zeta_{(m-m_k, n-n_{k+2})}\right)}{\zeta_{(m_k-m_k, n_{k+3}-n_{k+2})}}$$

wherein
$\check{\Omega}_{m_k n_{k+1}} = \{(m,n), \zeta_{(m-m_k, n-n_{k+1})} \neq 0, \text{ and } (m,n) \neq \{(m_k,n_k),(m_k,n_{k+1}),(m_k,n_{k+2})\}\}$,
$\check{\Omega}_{m_k n_{k+2}} = \{(m,n), \zeta_{(m-m_k, n-n_{k+2})} \neq 0, \text{ and } (m,n) \neq \{(m_k,n_{k+3}),(m_k,n_{k+1}),(m_k,n_{k+2})\}\}$.

16. A receiving device, comprising: a processor, at least one receive antenna port connected to the processor by using an interface, and a memory connected to the processor by using a bus, wherein the memory stores a group of program code, and the processor is configured to invoke the program code stored in the memory to perform the following operations:
for each receiving antenna port, receiving a pilot symbol group, wherein the pilot symbol group comprises two auxiliary pilot symbols and two primary pilot symbols, the auxiliary pilot symbols are configured to cancel interference caused by other data symbols to the primary pilot symbols;
obtaining receive values at time-frequency resource locations at which primary pilot symbols sent from each transmit antenna port to each receive antenna port are located, wherein the interference caused by the other data symbols to the primary pilot symbols is cancelled for the receive values by using the auxiliary pilot symbols;
determining a receiving sequence from each transmit antenna port to each receive antenna port; and
calculating, for each transmit antenna port to each receive antenna port, an estimation value of a channel between the transmit antenna port and the receive antenna port according to the receive values of the primary pilot symbols and the receiving sequence.

17. The receiving device according to claim 16, wherein the determining, by the processor, a receiving sequence from each transmit antenna port to each receive antenna port comprises:
obtaining an interference response matrix for the time-frequency resource locations at which the primary pilot symbols at a transmit end are located;
obtaining a transmit matrix that comprises transmit values of the primary pilot symbols at the transmit end; and
calculating the receiving sequence from each transmit antenna port to each receive antenna port according to the interference response matrix and the transmit matrix.

18. The receiving device according to claim 17, wherein when the interference response matrix of the transmit end is $\Gamma$, the transmit matrix of the transmit end is P, and a receiving sequence of a transmit antenna port j is $[b_0^j, b_1^j, \ldots, b_n^j]^T$, the calculating, by the processor, the receiving sequence of the transmit antenna port is specifically:
$[b_0^j, b_1^j, \ldots, b_n^j]^T = \Gamma^{-1} P^{-1} (0, \ldots, 0, w_j, 0, \ldots, 0)^T$,
wherein bin is an element in a receiving sequence at a time-frequency resource location at which the $n^{th}$ primary pilot symbol of the transmit antenna port j is located, $w_j$ indicates pilot channel estimation gain power of the transmit antenna port j, a quantity of 0s in $(0, \ldots, 0, w_j, 0, \ldots, 0)^T$ is equal to n−1, $w_j$ in $(0, \ldots, 0, w_j, 0, \ldots, 0)^T$ appears at the $j^{th}$ location, and values at other locations are 0.

19. The receiving device according to claim 17, wherein the obtaining, by the processor, an interference response matrix for the time-frequency resource locations at which the primary pilot symbols at a transmit end are located comprises:
receiving an interference response matrix indication message sent by the transmit end; and
determining the interference response matrix for the time-frequency resource locations of the primary pilot symbols at the transmit end according to the interference response matrix indication message.

20. The receiving device according to claim 17, wherein the obtaining, by the processor, an interference response matrix for the time-frequency resource locations at which the primary pilot symbols at a transmit end are located comprises:
determining time-frequency resource locations of primary pilot symbols that is in a pilot symbol group and that cause interference to the primary pilot symbols at the transmit end;
obtaining interference coefficient values of interference caused at the determined time-frequency resource locations of the primary pilot symbols in the pilot symbol group to the primary pilot symbols; and
constructing the interference response matrix by using the interference coefficient values.

21. The receiving device according to claim 16, wherein the calculating, by the processor for each transmit antenna port to each receive antenna port, an estimation value of a channel between the transmit antenna port and the receive antenna port according to the receive values of the primary pilot symbols and the receiving sequence comprises:
for each transmit antenna port to each receive antenna port, calculating a product of row vectors that comprise the receive values of the primary pilot symbols and column vectors that comprise the receiving sequence of the transmit antenna port; and
calculating a ratio of the product result to pilot channel estimation gain power of the transmit antenna port, and using the ratio as the estimation value of the channel between the transmit antenna port and the receive antenna port.

22. The receiving device according to claim 21, wherein for each transmit antenna port on each receive antenna port, when receive values of primary pilot symbols of a receive antenna port i are separately $r^j_0, r^j_1, \ldots, r^j_n$, wherein $r^j_n$ is a receive value at a time-frequency resource location at which the $n^{th}$ primary pilot symbol of the receive antenna port i is located, and an estimation value of a channel between the transmit antenna port j and the receive antenna port i is $H_{ij}$, the calculating, by the processor, an estimation value of a channel between the transmit antenna port and the receive antenna port is specifically:

$$H_{ij}=[r^j_0, r^j_1, \ldots, r^j_n][b^j_0, b^j_1, \ldots, b^j_n]^T/w_j.$$

\* \* \* \* \*

UNITED STATES PATENT AND TRADEMARK OFFICE
CERTIFICATE OF CORRECTION

PATENT NO. : 10,333,757 B2  
APPLICATION NO. : 15/383218  
DATED : June 25, 2019  
INVENTOR(S) : Guangmei Ren, Hua Yan and Lei Min It is certified that error appears in the above-identified patent and that said Letters Patent is hereby corrected as shown below:

In the Claims

In Column 45, Line 3, in Claim 2, delete "$(N+1)^{th}$," and insert -- a $(N+1)^{th}$, --, therefor.

In Column 47, Line 47, in Claim 11, delete "$[b^i_0, b^i_0, b^i_1,$" and insert -- $[b^i_0, b^i_1,$ --, therefor.

In Column 48, Line 64, in Claim 15, delete "$(m_k, n_k\ _{+1})$" and insert -- $(m_k, n_{k+1})$ --, therefor.

In Column 50, Line 17, in Claim 18, delete "(0 ," and insert -- (0, --, therefor.

In Column 50, Line 18, in Claim 18, delete "bin" and insert -- $b^i_n$ --, therefor.

In Column 50, Line 23, in Claim 18, delete "(0 ," and insert -- (0, --, therefor.

In Column 50, Line 24, in Claim 18, delete "$0. \ldots, 0)^{T}$" and insert -- $0, \ldots, 0)^T$ --, therefor.

Signed and Sealed this  
Seventh Day of January, 2020

Andrei Iancu  
*Director of the United States Patent and Trademark Office*